United States Patent
Roumeliotis et al.

(10) Patent No.: US 10,907,971 B2
(45) Date of Patent: Feb. 2, 2021

(54) SQUARE ROOT INVERSE SCHMIDT-KALMAN FILTERS FOR VISION-AIDED INERTIAL NAVIGATION AND MAPPING

(71) Applicant: Regents of the University of Minnesota, Minneapolis, MN (US)

(72) Inventors: Stergios I. Roumeliotis, St Paul, MN (US); Kejian J. Wu, Minneapolis, MN (US); Tong Ke, Mountain View, CA (US)

(73) Assignee: Regents of the University of Minnesota, Minneapolis, MN (US)

( * ) Notice: Subject to any disclaimer, the term of this patent is extended or adjusted under 35 U.S.C. 154(b) by 64 days.

(21) Appl. No.: 16/213,248

(22) Filed: Dec. 7, 2018

(65) Prior Publication Data

US 2019/0178646 A1    Jun. 13, 2019

Related U.S. Application Data

(60) Provisional application No. 62/771,695, filed on Nov. 27, 2018, provisional application No. 62/596,328, filed on Dec. 8, 2017.

(51) Int. Cl.
*G01C 21/16* (2006.01)
*G06T 7/73* (2017.01)
(Continued)

(52) U.S. Cl.
CPC .......... *G01C 21/165* (2013.01); *G01C 21/20* (2013.01); *G05D 1/027* (2013.01); *G05D 1/0246* (2013.01);
(Continued)

(58) Field of Classification Search
USPC ........................................................ 701/510
See application file for complete search history.

(56) References Cited

U.S. PATENT DOCUMENTS

| | | | |
|---|---|---|---|
| 5,847,755 | A | 12/1998 | Wixson et al. |
| 6,104,861 | A | 8/2000 | Tsukagoshi |
| | | (Continued) | |

FOREIGN PATENT DOCUMENTS

| | | |
|---|---|---|
| WO | WO2015013418 A2 | 1/2015 |
| WO | WO2015013534 A1 | 1/2015 |
| WO | WO2018/026544 A1 | 2/2018 |

OTHER PUBLICATIONS

"Project Tango," retrieved from https://www.google.com/atap/projecttango on Nov. 2, 2015, 4 pp.
(Continued)

*Primary Examiner* — Tyler D Paige
(74) *Attorney, Agent, or Firm* — Shumaker & Sieffert, P.A.

(57) ABSTRACT

A vision-aided inertial navigation system comprises an image source to produce image data for poses of reference frames along a trajectory, a motion sensor configured to provide motion data of the reference frames, and a hardware-based processor configured to compute estimates for a position and orientation of the reference frames for the poses. The processor executes a square-root inverse Schmidt-Kalman Filter (SR-ISF)-based estimator to compute, for features observed from poses along the trajectory, constraints that geometrically relate the poses from which the respective feature was observed. The estimator determines, in accordance with the motion data and the computed constraints, state estimates for position and orientation of reference frames for poses along the trajectory and computes positions of the features that were each observed within the environment. Further, the estimator determines uncertainty (Continued)

data for the state estimates and maintains the uncertainty data as a square root factor of a Hessian matrix.

30 Claims, 4 Drawing Sheets

(51) Int. Cl.
    *G05D 1/02*         (2020.01)
    *G06T 7/277*        (2017.01)
    *G01C 21/20*       (2006.01)
    *G06T 7/269*        (2017.01)

(52) U.S. Cl.
    CPC .............. *G06T 7/269* (2017.01); *G06T 7/277* (2017.01); *G06T 7/74* (2017.01); *G06T 7/75* (2017.01); *G06T 2207/10021* (2013.01); *G06T 2207/10028* (2013.01); *G06T 2207/30241* (2013.01); *G06T 2207/30244* (2013.01)

(56) References Cited

U.S. PATENT DOCUMENTS

| | | |
|---|---|---|
| 6,496,778 B1 | 12/2002 | Lin |
| 7,015,831 B2 | 3/2006 | Karisson et al. |
| 7,162,338 B2 | 1/2007 | Goncalves et al. |
| 7,991,576 B2 | 8/2011 | Roumeliotis |
| 8,577,539 B1 | 11/2013 | Morrison et al. |
| 8,965,682 B2 | 2/2015 | Tangirala et al. |
| 8,996,311 B1 | 3/2015 | Morin et al. |
| 9,026,263 B2 | 5/2015 | Hoshizaki |
| 9,031,809 B1 | 5/2015 | Kumar et al. |
| 9,243,916 B2 | 1/2016 | Roumeliotis et al. |
| 9,607,401 B2 | 3/2017 | Roumeliotis et al. |
| 9,658,070 B2 | 5/2017 | Roumeliotis et al. |
| 9,709,404 B2 | 7/2017 | Roumeliotis et al. |
| 9,766,074 B2 | 9/2017 | Roumeliotis et al. |
| 9,996,941 B2 | 6/2018 | Roumeliotis et al. |
| 10,012,504 B2 | 7/2018 | Roumeliotis et al. |
| 10,203,209 B2 | 2/2019 | Roumeliotis et al. |
| 10,254,118 B2 | 4/2019 | Roumeliotis et al. |
| 10,371,529 B2 | 8/2019 | Roumeliotis et al. |
| 2002/0198632 A1 | 12/2002 | Breed et al. |
| 2003/0149528 A1 | 8/2003 | Lin |
| 2004/0073360 A1 | 4/2004 | Foxlin |
| 2004/0167667 A1 | 8/2004 | Goncalves et al. |
| 2005/0013583 A1 | 1/2005 | Itoh |
| 2007/0038374 A1 | 2/2007 | Belenkii et al. |
| 2008/0167814 A1 | 7/2008 | Samarasekera et al. |
| 2008/0265097 A1 | 10/2008 | Stecko et al. |
| 2008/0279421 A1 | 11/2008 | Hamza et al. |
| 2009/0212995 A1 | 8/2009 | Wu et al. |
| 2010/0110187 A1 | 5/2010 | von Flowtow et al. |
| 2010/0211316 A1 | 8/2010 | Da Silva et al. |
| 2010/0220176 A1 | 9/2010 | Ziemeck et al. |
| 2011/0238307 A1* | 9/2011 | Psiaki ................... G01C 21/28 701/469 |
| 2012/0121161 A1 | 5/2012 | Eade |
| 2012/0194517 A1 | 8/2012 | Izadi et al. |
| 2012/0203455 A1 | 8/2012 | Louis et al. |
| 2013/0138264 A1 | 5/2013 | Hoshizaki |
| 2013/0335562 A1 | 12/2013 | Ramanandan et al. |
| 2014/0372026 A1 | 12/2014 | Georgy et al. |
| 2015/0219767 A1 | 8/2015 | Humphreys et al. |
| 2015/0356357 A1 | 12/2015 | McManus et al. |
| 2016/0161260 A1 | 6/2016 | Mourikis |
| 2016/0364990 A1 | 12/2016 | Khaghani et al. |
| 2017/0176189 A1 | 6/2017 | D'Aquila |
| 2018/0023953 A1 | 1/2018 | Roumelitotis et al. |
| 2018/0082137 A1 | 3/2018 | Melvin et al. |
| 2018/0259341 A1* | 9/2018 | Aboutalib ............ G08G 5/0047 |
| 2018/0328735 A1 | 11/2018 | Roumeliotis et al. |
| 2019/0154449 A1 | 5/2019 | Roumelitotis et al. |
| 2019/0178646 A1* | 6/2019 | Roumeliotis ........ G05D 1/0253 |

OTHER PUBLICATIONS

Agarwal et al., "A Survey of Geodetic Approaches to Mapping and the Relationship to Graph-Based SLAM," IEEE Robotics and Automation Magazine, vol. 31, Sep. 2014, 17 pp.

Ait-Aider et al., "Simultaneous object pose and velocity computation using a single view from a rolling shutter camera," Proceedings of the IEEE European Conference on Computer Vision, May 7-13, 2006, pp. 56-68.

Ayacite et al., "Maintaining Representations of the Environment of a Mobile Robot," IEEE Transactions on Robotics and Automation, vol. 5, No. 6, Dec. 1989, pp. 804-819.

Bailey et al., "Simultaneous Localisation and Mapping (SLAM): Part II State of the Art," IEEE Robotics and Automation Magazine, vol. 13, No. 3, Sep. 2006, 10 pp.

Baker et al., "Removing rolling shutter wobble," Proceedings of the IEEE Conference on Computer Vision and Pattern Recognition, Jun. 13-18, 2010, 8 pp.

Bar-Shalom et al., "Estimation with Applications to Tracking and Navigation," Chapter 7, Estimation with Applications to Tracking and Navigation, ISBN 0-471-41655-X, Jul. 2001, 20 pp.

Bartoli et al., "Structure from Motion Using Lines: Representation, Triangulation and Bundle Adjustment," Computer Vision and Image Understanding, vol. 100, Aug. 11, 2005, pp. 416-441.

Bayard et al., "An Estimation Algorithm for Vision-Based Exploration of Small Bodies in Space," 2005 American Control Conference, Jun. 8-10, 2005, pp. 4589-4595.

Bierman, "Factorization Methods for Discrete Sequential Estimation," Mathematics in Science and Engineering, Academic Press, vol. 128, 1977, 259 pp. (Applicant points out that, in accordance with MPEP 609.04(a), the 1977 year of publication is sufficiently earlier than the effective U.S. filing date of the present application and any foreign priority date so that the particular month of publication is not in issue.).

Bloesch et al., "Iterated Extended Kalman Filter Based Visual-Inertial Odometry Using Direct Photometric Feedback," International Journal of Robotics Research, vol. 36, No. 10, Sep. 2017, 19 pp.

Bloesch et al., "Robust Visual Inertial Odometry Using a Direct EKF-Based Approach," Proceeding of the IEEE/RSJ International Conference on Intelligent Robots and Systems, Sep. 2015, 7 pp.

Bouguet, "Camera Calibration Toolbox for Matlab," retrieved from http://www.vision.caltech.edu/bouguetj/calib_doc/., Oct. 14, 2015, 5 pp.

Boyd et al., "Convex Optimization," Cambridge University Press, 2004, 730 pp. (Applicant points out that, in accordance with MPEP 609.04(a), the year of publication, 2004, is sufficiently earlier than the effective U.S. filing date of the present application and any foreign priority date so that the particular month of publication is not in issue.).

Breckenridge, "Interoffice Memorandum to T. K. Brown, Quaternions—Proposed Standard Conventions," IOM 343-79-1199, Oct. 31, 1979, 12 pp.

Burri et al., "The EuRoC Micro Aerial Vehicle Datasets," International Journal of Robotics Research, vol. 35, No. 10, Sep. 2016, 9 pp.

Canny, "A Computational Approach to Edge Detection," IEEE Transactions on Pattern Analysis and Machine Intelligence, vol. 8, No. 6, Nov. 1986, pp. 679-698.

Chauhan et al., "Femoral Artery Pressures Are More Reliable Than Radial Artery. Pressures on Initiation of Cardiopulmonary Bypass," Journal of Cardiothoracic and Vascular Anesthesia, vol. 14, No. 3, Jun. 2000, 3 pp.

Chen et al., "Local Observability Matrix and its Application to Observability Analyses," Proceedings of the 16th Annual Conference IEEE Industrial Electronics Society, Nov. 1990, 4 pp.

Chen, "Pose Determination from Line-to-Plane Correspondences: Existence Condition and Closed-Form Solutions," Proc. 3rd. Int. Coni. Comp. Vision, Dec. 4-7, 1990, pp. 374-378.

Chiu et al., "Robust vision-aided navigation using sliding-window factor graphs," 2013 IEEE International Conference on Robotics and Automation, May 6-10, 2013, pp. 46-53.

(56) References Cited

OTHER PUBLICATIONS

Chiuso et al., "Structure from Motion Causally Integrated Over Time," IEEE Transactions on Pattern Analysis and Machine Intelligence, vol. 24, No. 4, Apr. 2002, pp. 523-535.
Davison et al., "Simultaneous Localisation and Map-Building Using Active Vision," Jun. 2001, 18 pp.
Deans., "Maximally Informative Statistics for Localization and Mapping", Proceedings of the 2002 IEEE International Conference on Robotics & Automation, (Washington, D.C.), May 2002, 1824-1829.
Dellaert et al., "Square Root SAM: Simultaneous Localization and Mapping via Square Root Information Smoothing," International Journal of Robotics and Research, vol. 25, No. 12, Dec. 2006, pp. 1181-1203.
Diel, "Stochastic Constraints for Vision-Aided Inertial Navigation," Massachusetts Institute of Technology, Department of Mechanical Engineering, Master Thesis, Jan. 2005, 106 pp.
Dong-Si et al., "Motion Tracking with Fixed-lag Smoothing: Algorithm and Consistency Analysis," Proceedings of the IEEE International Conference on Robotics and Automation, May 9-13, 2011, 8 pp.
Durrant-Whyte et al., "Simultaneous Localisation and Mapping (SLAM): Part I the Essential Algorithms," IEEE Robotics and Automation Magazine, vol. 13, No. 2, Jun. 2006, 9 pp.
DuToit et al., "Consistent Map-based 3D Localization on Mobile Devices," Proceedings of the IEEE International Conference on robotics and Automation, May 2017, 8 pp.
Eade et al., "Scalable Monocular SLAM," Proceedings of the 2006 IEEE Computer Society Conference on Computer Vision and Pattern Recognition (CVPR '06), vol. 1, Jun. 17-22, 2006, 8 pp.
Engel et al., "Direct Sparse Odometry," IEEE Transactions on Pattern Analysis and Machine Intelligence, vol. 40, No. 3, Mar. 2018, 15 pp.
Engel et al., "LSD-SLAM: Large-Scale Direct Monocular SLAM," Proceedings of the European Conference on Computer Vision, Sep. 2014, 16 pp.
Engel et al., "Semi-Dense Visual Odometry for a Monocular Camera," Proceedings of the IEEE International Conference on Computer Vision, Dec. 2013, 8 pp.
Erdogan et al., "Planar Segmentation of RGBD Images Using Fast Linear Filling and Markov Chain Monte Carlo," Proceedings of the IEEE International Conference on Computer and Robot Vision, May 27-30, 2012, pp. 32-39.
Eustice et al., "Exactly Sparse Delayed-slate Filters for View-based SLAM," IEEE Transactions on Robotics, vol. 22 (6), Dec. 2006, pp. 1100-1114.
Eustice et al., "Visually Navigating the RMS Titanic With SLAM Information Filters," Proceedings of Robotics Science and Systems, Jun. 2005, 9 pp.
Forster et al., "IMU Preintegration on Manifold for Efficient Visual-Inertial Maximum-a-posteriori Estimation," Proceedings of Robotics: Science and Systems, Jul. 2015, 10 pp.
Forester et al., "SVO: Semi-Direct Visual Odometry for Monocular and Multi-Camera Systems," IEEE Transactions on Robotics, vol. 33, No. 2, Apr. 2017, 18 pp.
Furgale et al., "Unified temporal and spatial calibration for multi-sensor systems," Proceedings of the IEEE/RSJ International Conference on Intelligent Robots and Systems, Nov. 3-7, 2013, pp. 1280-1286.
Garcia et al., "Augmented State Kalman Filtering for AUV Navigation." Proceedings of the 2002 IEEE International Conference on Robotics & Automation, May 2002, 6 pp.
Golub et al., "Matrix Computations, Third Edition," The Johns Hopkins University Press, 2012, 723 pp. (Applicant points out that, in accordance with MPEP 609.04(a), the 2012 year of publication is sufficiently earlier than the effective U.S. filing date of the present application and any foreign priority date so that the particular month of publication is not in issue.).
Golub et al., "Matrix Computations, Fourth Edition," The Johns Hopkins University Press, 2013, 780 pp. (Applicant points out that, in accordance with MPEP 609.04(a), the 2013 year of publication is sufficiently earlier than the effective U.S. filing date of the present application and any foreign priority date so that the particular month of publication is not in issue.).
Golub et al., "Matrix Multiplication Problems," Chapter 1, Matrix Computations, Third Edition, ISBN 0-8018-5413-X, 1996. (Applicant points out, in accordance with MPEP 609.04(a), that the year of publication, 1996, is sufficiently earlier than the effective U.S. filing date of the present application and any foreign priority date so that the particular month of publication is not in issue.).
Guivant et al., "Optimization of the Simultaneous Localization and Map-Building Algorithm for Real-Time Implementation," IEEE Transactions on Robotics and Automation, vol. 17, No. 3, Jun. 2001, 16 pp.
Guo et al., "An Analytical Least-Squares Solution to the Odometer-Camera Extrinsic Calibration Problem," Proceedings of the IEEE international Conference on Robotics and Automation, May 2012, 7 pp.
Guo et al., "Efficient Visual-Inertial Navigation using a Rolling-Shutter Camera with Inaccurate Timestamps," Proceedings of Robotics: Science and Systems, Jul. 2014, 9 pp.
Guo et al., "IMU-RGBD Camera 3D Pose Estimation and Extrinsic Calibration: Observability Analysis and Consistency Improvement," Proceedings of the IEEE International Conference on Robotics and Automation, May 6-10, 2013, pp. 2935-2942.
Guo et al., "Observability-constrained EKF Implementation of the IMU-RGBD Camera Navigation Using Point and Plane Features," Technical Report. University of Minnesota, Mar. 2013, 6 pp.
Guo et al., "Resource-Aware Large-Scale Cooperative 3D Mapping from Multiple Cell Phones," Multiple Autonomous Robotic Systems (MARS) Lab, ICRA Poster May 26-31, 2015, 1 pp.
Harris et al., "A combined corner and edge detector," Proceedings of the Alvey Vision Conference, Aug. 31-Sep. 2, 1988, pp. 147-151.
Hermann et al., "Nonlinear Controllability and Observability," IEEE Transactions on Automatic Control, vol. 22, No. 5, Oct. 1977, pp. 728-740.
Herrera et al., "Joint Depth and Color Camera Calibration with Distortion Correction," IEEE Trans. on Pattern Analysis and Machine Intelligence, vol. 34(10), Oct. 2012, pp. 2058-2064.
Hesch et al., "Consistency analysis and improvement of vision-aided inertial navigation," IEEE Transactions on Robotics, vol. 30, No. 1, Feb. 2014, pp. 158-176.
Hesch et al., "Observability-constrained Vision-aided inertial Navigation," University of Minnesota, Department of Computer Science and Engineering, MARS Lab, Feb. 2012, 24 pp.
Hesch et al., "Towards Consistent Vision-aided Inertial Navigation," Proceedings of the 10th International Workshop on the Algorithmic Foundations of Robotics, Jun. 13-15, 2012, 16 pp.
Higham, "Matrix Inversion," Chapter 14, Accuracy and Stability of Numerical Algorithms, Second Edition, ISBN 0-89871-521-0, 2002, 29 pp. (Applicant points out, in accordance with MPEP 609.04(a), that the year of publication, 2002, is sufficiently earlier than the effective U.S. filing date of the present application and any foreign priority date, so that the particular month of publication is not in issue.).
Horn, "Closed-form solution of absolute orientation using unit quaternions," Journal of the Optical Society of America A, vol. 4, Apr. 1987, 14 pp.
Horn et al., "Closed-form solution of absolute orientation using orthonormal matrices," Journal of the Optical Society of America A, vol. 5, No. 7, Jul. 1988, pp. 1127-1135.
Huang et al., "Observability-based rules for designing consistent EKF slam estimators," International Journal of Robotics Research, vol. 29, No. 5, Apr. 2010, pp. 502-528.
Huang et al., "Visual Odometry and Mapping for Autonomous Flight Using an RGB-D Camera," Proceedings of the International Symposium on Robotics Research, Aug. 28-Sep. 1, 2011, 16 pp.
Huster, "Relative Position Sensing by Fusing Monocular Vision and Inertial Rate Sensors," Stanford University, Department of Electrical Engineering, Dissertation, Jul. 2003, 158 pp.
Jia et al., "Probabilistic 3-D motion estimation for rolling shutter video rectification from visual and inertial measurements," Proceed-

(56) References Cited

OTHER PUBLICATIONS ings of the IEEE International Workshop on Multimedia Signal Processing, Sep. 2012, pp. 203-208.

Johannsson et al., "Temporally Scalable Visual Slam Using a Reduced Pose Graph," in Proceedings of the IEEE International Conference on Robotics and Automation, May 6-10, 2013, 8 pp.

Jones et al., "Visual-inertial Navigation, Mapping and Localization: A Scalable Real-time Causal Approach," International Journal of Robotics Research, vol. 30, No. 4, Mar. 31, 2011, pp. 407-430.

Julier, "A Sparse Weight Kalman Filter Approach to Simultaneous Localisation and Map Building," Proceedings of the IEEE/RSJ International Conference on Intelligent Robots and Systems, vol. 3, Oct. 2001, 6 pp.

Julier et al., "A Non-divergent Estimation Algorithm in the Presence of Unknown Correlations," Proceedings of the American Control Conference, vol. 4, Jun. 1997, 5 pp.

Kaess et al., "iSAM: Incremental Smoothing and Mapping," IEEE Transactions on Robotics, Manuscript, Sep. 7, 2008, 14 pp.

Kaess et al., "iSAM2: Incremental Smoothing and Mapping Using the Bayes Tree," International Journal of Robotics Research, vol. 31, No. 2, Feb. 2012, pp. 216-235.

"Kalman filter," Wikipedia, the Free Encyclopedia, accessed from https://en.wikipedia.org/w/index.php?title=Kalman_filter&oldid=730505034, Jul. 19, 2016, 30 pp.

Kelly et al., "A general framework for temporal calibration of multiple proprioceptive and exteroceptive sensors," Proceedings of International Symposium on Experimental Robotics, Dec. 18-21, 2010, 15 pp.

Kelly et al., "Visual-inertial sensor fusion: Localization, mapping and sensor-to-sensor self-calibration," International Journal of Robotics Research, vol. 30, No. 1, Jan. 2011, pp. 56-79.

Klein et al., "Parallel Tracking and Mapping for Small AR Workspaces," Proceedings of the IEEE and ACM International Symposium on Mixed and Augmented Reality, Nov. 13-16, 2007, pp. 225-234.

Kneip et al., "Robust Real-Time Visual Odometry with a Single Camera and an IMU," Proceedings of the British Machine Vision Conference, Aug. 29-Sep. 2, 2011, pp. 16.1-16.11.

Konolige et al., "Efficient Sparse Pose Adjustment for 2D Mapping," Proceedings of the IEEE/RSJ International Conference on Intelligent Robots and Systems, Oct. 18-22, 2010, pp. 22-29.

Konolige et al., "FrameSLAM: From Bundle Adjustment to Real-Time Visual Mapping," IEEE Transactions on Robotics, vol. 24, No. 5, Oct. 2008, pp. 1066-1077.

Konolige et al., "View-based Maps," International Journal of Robotics Research, vol. 29, No. 8, Jul. 2010, 14 pp.

Kottas et al., "A Resource-aware Vision-aided Inertial Navigation System for Wearable and Portable Computers," IEEE International Conference on Robotics and Automation, Accepted Apr. 18, 2014, available online May 6, 2014, 3 pp.

Kottas et al., "An Iterative Kalman Smoother for Robust 3D Localization on Mobile and Wearable devices," Submitted confidentially to International Conference on Robotics & Automation, ICRA '15, May 5, 2015, 8 pp.

Kottas et al., "An iterative Kalman smoother for robust 3D localization on mobile and wearable devices," Proceedings of the IEEE International Conference on Robotics and Automation, May 26-30, 2015, pp. 6336-6343.

Kottas et al., "An Iterative Kalman Smoother for Robust 3D Localization and mapping," ISRR, Tech Report, Oct. 16, 2014, 15 pp.

Kottas et al., "Detecting and dealing with hovering maneuvers in vision-aided inertial navigation systems," Proceedings of the IEEE/RSJ International Conference on Intelligent Robots and Systems, Nov. 3-7, 2013, pp. 3172-3179.

Kottas et al., "Efficient and Consistent Vision-aided Inertial Navigation using Line Observations," Department of Computer Science & Engineering, University of Minnesota, MARS Lab, TR-2012-002, Sep. 2012, 14 pp.

Kottas et al., "On the Consistency of Vision-aided Inertial Navigation," Proceedings of the International Symposium on Experimental Robotics, Jun. 17-20, 2012, 15 pp.

Kummerle et al., "g2o: A General Framework for Graph Optimization," in Proceedings of the IEEE International Conference on Robotics and Automation, May 9-13, 2011, pp. 3607-3613.

Langelaan, "State Estimation for Autonomous Flight in Cluttered Environments," Stanford University, Department of Aeronautics and Astronautics, Dissertation, Mar. 2006, 128 pp.

Leutenegger et al., "Keyframe-based visual-inertial odometry using nonlinear optimization," The International Journal of Robotics Research, vol. 34, No. 3, Mar. 2015, pp. 314-334.

Li et al., "3-D Motion Estimation and Online Temporal Calibration for Camera-IMU Systems," Proceedings of the IEEE International Conference on Robotics and Automation, May 6-10, 2013, pp. 5709-5716.

Li et al., "High-Precision, Consistent EKF-based Visual-Inertial Odometry," International Journal of Robotics Research, vol. 32, No. 6, May 2013, 33 pp.

Li et al., "Improving the Accuracy of EKF-based Visual-Inertial Odometry," 2012 IEEE International Conference on Robotics and Automation, May 14-18, 2012, pp. 828-835.

Li et al., "Optimization-Based Estimator Design for Vision-Aided Inertial Navigation," Proceedings of the Robotics: Science and Systems Conference, Jul. 9-13, 2012, 8 pp.

Li et al., "Real-time Motion Tracking on a Cellphone using Inertial Sensing and a Rolling-Shutter Camera," 2013 IEEE international Conference on Robotics and Automation (ICRA), May 6-10, 2013, 8 pp.

Li et al., "Vision-aided inertial navigation with rolling-shutter cameras," The International Journal of Robotics Research, retrieved from ijr.sagepub.com on May 22, 2015, 18 pp.

Lim et al., "Zero-Configuration Indoor Localization over IEEE 802.11 Wireless Infrastructure," Jun. 23, 2008. 31 pp.

Liu et al., "Estimation of Rigid Body Motion Using Straight Line Correspondences," Computer Vision, Graphics, and Image Processing, vol. 43, No. 1, Jul. 1988, pp. 37-52.

Liu et al., "ICE-BA: Incremental, Consistent and Efficient Bundle Adjustment for Visual-Inertial SLAM," Proceedings of the IEEE Conference on Computer Vision and Pattern Recognition, Jun. 2018, 9 pp.

Liu et al., "Multi-aided Inertial Navigation for Ground Vehicles in Outdoor Uneven Environments," Proceedings of the IEEE International Conference on Robotics and Automation, Apr. 18-22, 2005, pp. 4703-4708.

Lowe, "Distinctive Image Features from Scale-Invariant Keypoints," International Journal of Computer Vision, Jan. 5, 2004, 28 pp.

Lucas et al., "An Iterative Image Registration Technique with an Application to Stereo Vision," Proceedings of the 7th International Joint Conference on Artificial Intelligence, Aug. 24-28, 1981, pp. 674-679.

Lupton et al., "Visual-inertial-aided Navigation for High-dynamic Motion in Built Environments Without Initial Conditions," IEEE Transactions on Robotics, vol. 28, No. 1, Feb. 2012, pp. 61-76.

Lynen et al., "Get Out of My Lab: Large-scale, Real-Time Visual-Inertial Localization," Proceedings of robotics: Science and Systems, Jul. 2015, 10 pp.

Martinelli, "Closed-form Solution of Visual-inertial structure from Motion," International Journal of Computer Vision, vol. 106, No. 2, Jan. 2014, 16 pp.

Martinelli, "Vision and IMU Data Fusion: Closed-form Solutions for Attitude, Speed, Absolute Scale, and Bias Determination," IEEE Transactions on Robotics, vol. 28, No. 1, Feb. 2012, pp. 44-60.

Matas et al., "Robust Detection of Lines Using the Progressive Probabilistic Hough Transformation," Computer Vision and Image Understanding, vol. 78, No. 1, Apr. 2000, pp. 119-137.

Maybeck, "Stochastic models, estimation and control," vol. 1, Chapter 1, Academy Press, May 28, 1979, 19 pp.

McLauchlan, "The Variable State Dimension Filter Applied to Surface-Based Structure from Motion CVSSP Technical Report VSSP-TR-4/99," University of Surrey, Department of Electrical Engineering, Dec. 1999, 52 pp.

(56) References Cited

OTHER PUBLICATIONS

Meltzer et al., "Edge Descriptors for Robust Wide-baseline Correspondence," Proc. IEEE Conf. Comp. Vision Pall. Recognition., Jun. 23-28, 2008, pp. 1-8.
Mirzaei et al., "A Kalman Filter-based Algorithm for IMU-Camera Calibration: Observability Analysis and Performance Evaluation," IEEE Trans. Robot., vol. 24 No. 5, Oct. 2008, pp. 1143-1156.
Mirzaei et al., "Globally Optimal Pose Estimation from Line Correspondences," IEEE International Conference on Robotics and Automation, May 9-13, 2011, pp. 5581-5588.
Mirzaei et al., "Optimal Estimation of Vanishing Points in a Manhattan World," IEEE Int. Conference on Computer Vision, Nov. 6-13, 2011, pp. 2454-2461.
Montiel et al., "Unified Inverse Depth Parametrization for Monocular SLAM," Proceedings of Robotics: Science and Systems II (RSS-06), Aug. 16-19, 2006, 8 pp.
Mourikis et al., "A Dual-Layer Estimator Architecture for Long-term Localization," Proceedings of the Workshop on Visual Localization for Mobile Platfortns, Jun. 24-26, 2008, 8 pp.
Mourikis et al., "A Multi-State Constraint Kalman Filter for Vision-aided Inertial Navigation," IEEE International Conference on Robotics and Automation, Sep. 28, 2006, 20 pp.
Mourikis et al., "A Multi-State Constraint Kalman Filter for Vision-aided Inertial Navigation," IEEE International Conference on Robotics and Automation, Apr. 10-14, 2007, pp. 3565-3572.
Mourikis et al., "On the Treatment of Relative-Pose Measurements for Mobile Robot Localization," IEEE International Conference on Robotics and Automation, Conference Date May 15-19, 2006, Jun. 26, 2006, 8 pp.
Mourikis et al., "Vision-Aided Inertial Navigation for Spacecraft Entry, Descent, and Landing," IEEE Transactions on Robotics, vol. 25, No. 2, Apr. 2009, pp. 264-280.
Mur-Artal, et al., "ORB-SLAM: A Versatile and Accurate Monocular SLAM System," IEEE Transactions on Robotics, vol. 31, No. 5, Oct. 2015, 17 pp.
Mur-Artal et al., "ORB-SLAM2: An Open-Source SLAM System for Monocular, Stereo and RGB-D Cameras," IEEE Transactions on Robotics, vol. 33, vol. 5, Jun. 2017, 9 pp.
Mur-Artal, et al., "Visual-inertial Monocular SLAM with Map Reuse," IEEE Robotics and Automation Letters, vol. 2, No. 2, Apr. 2017, 8 pp.
Nerurkar et al., "C-KLAM: Constrained Keyframe-Based Localization and Mapping," Proceedings of the IEEE International Conference on Robotics and Automation, May 31-Jun. 7, 2014, 6 pp.
Nerurkar et al., "Power-SLAM: A Linear-Complexity, Anytime Algorithm for SLAM," International Journal of Robotics Research, vol. 30, No. 6, May 2011, 13 pp.
Nister et al., "Scalable Recognition with a Vocabulary Tree," 2006 IEEE Computer Society Conference on Computer Vision and Pattern Recognition, vol. 2, Jun. 2006, 8 pp.
Nister et al., "Visual Odometry for Ground Vehicle Applications," Journal of Field Robotics, vol. 23, No. 1, Jan. 2006, 35 pp.
Nocedal et al., "Numerical Optimization," $2^{nd}$ Ed. Springer, 2006, 683 pp. (Applicant points out, in accordance with MPEP 609.04(a), that the year of publication, 2006, is sufficiently earlier than the effective U.S. filing date of the present application and any foreign priority date, so that the particular month of publication is not in issue.).
Oliensis, "A New Structure from Motion Ambiguity," IEEE Transactions on Pattern Analysis and Machine Intelligence, vol. 22, No. 7, Jul. 2000, 30 pp.
Ong et al., "Six DoF Decentralised SLAM," Proceedings of the Australasian Conference on Robotics and Automation, 2003, 10 pp. (Applicant points out that, in accordance with MPEP 609.04(a), the 2003 year of publication is sufficiently earlier than the effective U.S. filing date of the present application and any foreign priority date so that the particular month of publication is not in issue.).
Oth et al., "Rolling shutter camera calibration," Proceedings of the IEEE Conference on Computer Vision and Pattern Recognition, Jun. 23-28, 2013, pp. 1360-1367.

Perea et al., "Sliding Windows and Persistence: An Application of Topological Methods to Signal Analysis," Foundations of Computational Mathematics, Nov. 25, 2013, 34 pp.
Prazenica et al., "Vision-Based Kalman Filtering for Aircraft State Estimation and Structure from Motion," AIAA Guidance, Navigation, and Control Conference and Exhibit, Aug. 15-18, 2005, 13 pp.
Qin et al., "VINS-Mono: A Robust and Versatile Monocular Visual-Inertial State Estimator," IEEE Transactions on Robotics, vol. 34, No. 4, Aug. 2018, 17 pp.
Rosten et al., "Machine Learning for High-Speed Corner Detection," Proceedings of the $9^{th}$ European Conference on Computer Vision, May 2006, 14 pp.
Roumeliotis et al., "Augmenting Inertial Navigation With Image-Based Motion Estimation," IEEE International Conference on Robotics and Automation, vol. 4, 2002, 8 pp. (Applicant points out that, in accordance with MPEP 609.04(a), the 2002 year of publication is sufficiently earlier than the effective U.S. filing date of the present application and any foreign priority date so that the particular month of publication is not in issue.).
Roumeliotis et al., "Stochastic Cloning: A Generalized Framework for Processing Relative State Measurements," Proceedings of the 2002 IEEE International Conference on Robotics and Automation, May 11-15, 2002, pp. 1788-1795.
Rublee et al., "ORB: An Efficient Alternative to SIFT or SURF," Proceedings of the IEEE International Conference on Computer Vision, Nov. 2011, 8 pp.
Schmid et al., "Automatic Line Matching Across Views," Proceedings of the IEEE Computer Science Conference on Computer Vision and Pattern Recognition, Jun. 17-19, 1997, pp. 666-671.
Servant et al., "Improving Monocular Plane-based SLAM with Inertial Measurements," 2010 IEEE/RSJ International Conference on Intelligent Robots and Systems, Oct. 18-22, 2010, pp. 3810-3815.
Shoemake et al., "Animating rotation with quaternion curves," ACM SIGGRAPH Computer Graphics, vol. 19, No. 3, Jul. 22-26, 1985, pp. 245-254.
Sibley et al., "Sliding Window Filter with Application to Planetary Landing," Journal of Field Robotics, vol. 27, No, 5, Sep./Oct. 2010, pp. 587-608.
Smith et al., "On the Representation and Estimation of Spatial Uncertainty," International Journal of Robotics Research, vol, 5(4), 1986, pp. 56-68. (Note: Applicant points out in accordance with MPEP 609.04(a) that the 1986 year of publication is sufficiently earlier than the effective U.S. filing date of the present application and any foreign priority date so that the particular month of publication is not in issue.).
Smith et al., "Real-time Monocular Slam with Straight Lines," British Machine vision Conference, vol. 1, Sep. 2006, pp. 17-26.
Soatto et al., "Motion Estimation via Dynamic Vision," IEEE Transactions on Automatic Control, vol. 41, No. 3, Mar. 1996, pp. 393-413.
Soatto et al., "Recursive 3-D Visual Motion Estimation Using Subspace Constraints," International Journal of Computer Vision, vol. 22, No. 3, Mar. 1997, pp. 235-259.
Spetsakis et al., "Structure from Motion Using Line Correspondences," International Journal of Computer Vision, vol. 4, No. 3), Jun. 1990, pp. 171-183.
Strelow, D. W., "Motion Estimation from Image and Inertial Measurements", CMU-CS-04-174, (Nov. 2004), 164 pgs.
Taylor et al., "Structure and Motion from Line Segments in Multiple Images," IEEE Transactions on Pattern Analysis and Machine Intelligence, vol. 17, No. 11, Nov. 1995, pp. 1021-1032.
Thorton et al., "Triangular Covariance Factorizations for Kalman Filtering," Technical Memorandum 33-798, National Aeronautics and Space Administration, Oct. 15, 1976, 212 pp.
Thrun et al. "The Graph SLAM Algorithm with Applications to Large-Scale Mapping of Urban Structures," International Journal of Robotics Research, vol. 25, Nos. 5-6, May 2006, 27 pp.
Trawny et al., "Indirect Kalman Filter for 3D Attitude Estimation," University of Minnesota, Department of Computer Science & Engineering, MARS Lab, Mar. 2005, 25 pp.

(56) References Cited

OTHER PUBLICATIONS

Triggs et al., "Bundle Adjustment—A Modern Synthesis," Proceedings of the International Workshop on Vision Algorithms: Theory and Practice, Lecture Notes in Computer Science, vol. 1883, Sep. 21-22, 1999, pp. 298-372.

Triggs et al., "Bundle Adjustment—A Modern Synthesis," Vision Algorithms: Theory & Practice, LNCS 1883, Apr. 12, 2002, 71 pp.

Weiss et al., "Real-time Metric State Estimation for Modular Vision-Inertial Systems," Proceedings of the IEEE International Conference on Robotics and Automation, May 9-13, 2011, pp. 4531-4537.

Weiss et al., "Real-time Onboard Visual-inertial State Estimation and Self-calibration of MAVs in Unknown Environment," Proceedings of the IEEE international Conference on Robotics and Automation, May 14-18, 2012, 957-964 pp.

Weiss et al., "Versatile Distributed Pose Estimation and sensor Self-Calibration for an Autonomous MAV," Proceedings of IEEE International Conference on Robotics and Automations, May 14-18, 2012, pp. 31-38.

Weng et al., "Motion and Structure from Line Correspondences: Closed-Form Solution, Uniqueness, and Optimization," IEEE Transactions on Pattern Analysis and Machine Intelligence, vol. 14, No. 3, Mar. 1992, pp. 318-336.

Williams et al., "Feature and Pose Constrained Visual Aided Inertial Navigation for Computationally Constrained Aerial Vehicles," 2011 IEEE International Conference on Robotics and Automation, May 9-13, 2011, pp. 431-438.

Wu et al., "A Square Root Inverse Filter for Efficient Vision-aided Inertial Navigation on Mobile Devices," Proceedings of Robotics: Science and Systems, Jul. 2015, 9 pp.

Zhou et al., "Determining 3d Relative Transformations for any Combination of Range and Bearing Measurements," IEEE Trans. on Robotics, vol. 29 No. 2, Apr. 2013, pp. 458-474.

Latif et al., "Applying Sparse $\ell_{11}$-Optimization to Problems in Robotics," ICRA 2014 Term Autonomy, Jun. 2014, 3 pp.

Lee et al., "Pose Graph-Based RGB-D SLAM in Low Dynamic Environments," ICRA Workshop on Long Term Autonomy, 2014, 19 pp. (Applicant points out, in accordance with MPEP 609.04(a), that the year of publication, 2014, is sufficiently earlier than the effective U.S. filing date so that the particular month of publication is not in issue.).

Taylor et al., "Parameterless Automatic Extrinsic Calibration of Vehicle Mounted Lidar-Camera Systems," Conference Paper, Mar. 2014, 3 pp.

U.S. Appl. No. 16/425,422, filed May 29, 2019, by Stergious I. Roumeliotis.

\* cited by examiner

SQUARE ROOT INVERSE SCHMIDT-KALMAN FILTERS FOR VISION-AIDED INERTIAL NAVIGATION AND MAPPING

This application claims the benefit of U.S. Provisional App. No. 62/596,328, filed Dec. 8, 2017 and U.S. Provisional App. No. 62/771,695, filed Nov. 27, 2018, the entire content of each of which is incorporated herein by reference.

GOVERNMENT INTEREST

This invention was made with government support under IIS-1328722 awarded by National Science Foundation. The government has certain rights in the invention.

TECHNICAL FIELD

This disclosure relates to navigation and, more particularly, to vision-aided inertial navigation.

BACKGROUND

In general, a Vision-aided Inertial Navigation System (VINS) fuses data from a camera and an Inertial Measurement Unit (IMU) to track the six-degrees-of-freedom (d.o.f.) position and orientation (pose) of a sensing platform through an environment. In this way, the VINS combines complementary sensing capabilities. For example, an IMU can accurately track dynamic motions over short time durations, while visual data can be used to estimate the pose displacement (up to scale) between consecutive views. For several reasons, VINS has gained popularity to address GPS-denied navigation. During the past decade, VINS have been successfully applied to robots, spacecraft, automotive, and personal localization (e.g., by use of smartphones or laptops), demonstrating real-time performance.

SUMMARY

In general, this disclosure describes techniques for implementing a square-root inverse form of a Schmidt-Kalman Filter (SR-ISF) for estimation within a vision-aided inertial navigation system (VINS). In one example, at least one image source of a VINS produces image data for a plurality of poses of a frame of reference along a trajectory within an environment over a period of time. In some examples, the image data includes features that were each observed within the environment at poses of the frame of reference along the trajectory. In some examples, the at least one image source observes one or more of the features at multiple ones of the poses of the frame of reference along the trajectory. Further, a motion sensor of the VINS provides motion data of the frame of reference in the environment for the period of time. The VINS further includes a hardware-based processor communicatively coupled to the image source and communicatively coupled to the motion sensor.

In accordance with the techniques of the disclosure, the processor computes estimates for at least a position and orientation of the frame of reference for each of the plurality of poses of the frame of reference along the trajectory by executing an SR-ISF-based estimator. In this example, the SR-ISF-based estimator computes, for the one or more of the features observed from multiple poses along the trajectory, one or more constraints that geometrically relate the multiple poses from which the respective feature was observed. The SR-ISF-based estimator further determines, in accordance with the motion data and the one or more computed constraints, state estimates for the position and orientation of the frame of reference for each of the plurality of poses along the trajectory. Further, the SR-ISF-based estimator determines uncertainty data for the state estimates and maintains the uncertainty data as an inverse square root factor, e.g., as one or more Cholesky factors, of a Hessian matrix.

In example implementations described herein, as the SR-ISF-based estimator described herein computes state estimates, the size of the state vector increases efficiently (e.g., linearly) with respect to processing and memory requirements. Therefore, the processor may efficiently compute, based on the state estimates for the position and orientation of the frame of reference for each of the plurality of poses along the trajectory, a map of approximate positions of the features observed along the trajectory. Accordingly, the SR-ISF-based estimator described herein may allow for a VINS to efficiently approximate simultaneous localization and mapping (SLAM) solutions on a large scale.

In one example, this disclosure describes a method comprising: receiving, with a processor and from at least one image source, image data for a plurality of poses of a frame of reference along a trajectory within an environment over a period of time, wherein the image data includes features that were each observed within the environment at poses of the frame of reference along the trajectory, and wherein one or more of the features were each observed at multiple ones of the poses of the frame of reference along the trajectory; receiving, with the processor and from a motion sensor communicatively coupled to the processor, motion data of the frame of reference in the environment for the period of time; computing, with the processor, state estimates for at least a position and orientation of the frame of reference for each of the plurality of poses of the frame of reference along the trajectory by executing a square-root inverse Schmidt-Kalman Filter (SR-ISF)-based estimator configured to: for one or more of the features observed from multiple poses along the trajectory, compute one or more constraints that geometrically relate the multiple poses from which the respective feature was observed; determine, in accordance with the motion data and the one or more computed constraints, the state estimates for at least the position and orientation of the frame of reference for each of the plurality of poses along the trajectory; and determine uncertainty data for the state estimates, wherein the estimator maintains the uncertainty data as a square root factor of a Hessian matrix.

In another example, this disclosure describes a vision-aided inertial navigation system (VINS) comprising: at least one image source to produce image data for a plurality of poses of a frame of reference along a trajectory within an environment over a period of time, wherein the image data includes features that were each observed within the environment at poses of the frame of reference along the trajectory, wherein one or more of the features were each observed at multiple ones of the poses of the frame of reference along the trajectory; a motion sensor configured to provide motion data of the frame of reference in the environment for the period of time; and a hardware-based processor communicatively coupled to the image source and communicatively coupled to the motion sensor, the processor configured to compute state estimates for at least a position and orientation of the frame of reference for each of the plurality of poses of the frame of reference along the trajectory, wherein the processor executes a square-root inverse Schmidt-Kalman Filter (SR-ISF)-based estimator configured to: for one or more of the features observed from multiple poses along the trajectory, compute one or more constraints that geometrically relate the multiple poses from which the respective feature was observed; determine, in accordance with the motion data and the one or more computed constraints, the state estimates for at least the position and orientation of the frame of reference for each of the plurality of poses along the trajectory; and determine uncertainty data for the state estimates, wherein the estimator maintains the uncertainty data as a square root factor of a Hessian matrix.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Techniques are described for implementing an estimator for vision-aided inertial navigation systems (VINS) based on an inverse square root form of a Multi-State Constraint Kalman Filter (MSCKF) for localization. In particular, a square-root inverse form of a Schmidt-Kalman Filter (SR-ISF) is described. Further example details of estimators implementing Kalman Filters for VINs, and more specifically, estimators implementing Multi-State Constraint Kalman Filters (MSCKFs) for VINs, are described in U.S. patent Ser. No. 12/383,371, filed Mar. 23, 2009, entitled "VISION-AIDED INERTIAL NAVIGATION," the entire content of which are incorporated herein by reference.

The SR-ISF estimator described herein may achieve technical advantages and increased performance relative to the SQRT form of an Inverse Sliding Window Filter estimator for VINS, as described in U.S. patent application Ser. No. 14/796,574, filed Jul. 10, 2015, entitled "INVERSE SLIDING-WINDOW FILTERS FOR VISION-AIDED INERTIAL NAVIGATION SYSTEMS," the entire contents of which is incorporated herein by reference. For example, as the SR-ISF-based estimator described herein computes state estimates, the size of the state vector may increase efficiently (e.g., linearly) with respect to processing and memory requirements. Therefore, the processor of a VINS system that uses an SR-ISF estimator as described herein may efficiently compute, based on the state estimates for the position and orientation of the frame of reference for each of the plurality of poses along the trajectory, a map of approximate positions of the features observed along the trajectory. Accordingly, a VINS system that uses an SR-ISF estimator as described herein may be suitable for large-scale SLAM problems to obtain efficient approximate mapping solutions. Further, such a VINS system that uses an SR-ISF estimator as described herein may be suitable for SLAM operations on resource-constrained devices, such as mobile devices, or for real-time mapping and navigation. In further examples, the techniques described herein may provide increased numerical stability, e.g. may handle double the condition number of the covariance matrix as compared to the Multi-State Constraint Kalman Filter (MSCKF). This may be advantageous for many applications, such as for stereoscopic applications in which the eigenvalues are close to zero.

Figure 1:
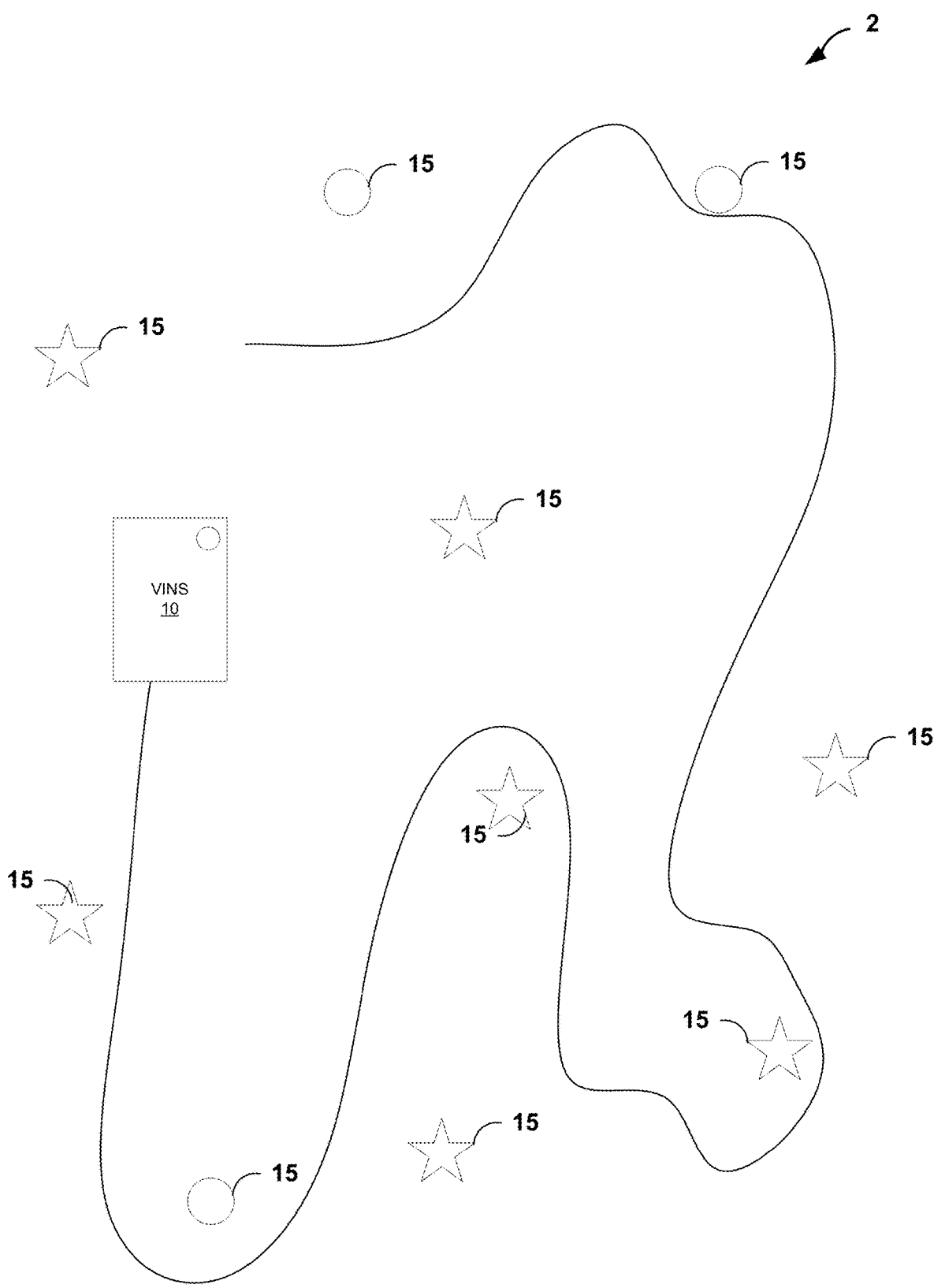
FIG. 1 is a block diagram illustrating a vision-aided inertial navigation system (VINS) that navigates an environment having a plurality of features using one or more image sources and inertial measurement unit (IMUs) according to the techniques described herein.

FIG. 1 is a block diagram illustrating a vision-aided inertial navigation system (VINS) 10 that navigates an environment 2 having a plurality of features 15 using one or more image sources and inertial measurement unit (IMUs). That is, VINS 10 is one example of a device that utilizes a 3D map of environment 2 to determine the position and orientation of VINS 10 as the VINS traverses the environment, where the map may be constructed in real-time by the VINS or previously constructed. Environment 2 may, for example, represent an environment where conventional GPS-signals are unavailable for navigation, such as on the moon or a different planet or even underwater. As additional examples, environment 2 may represent an indoors environment such as the interior of a building, such as a convention center, shopping mall, sporting arena, business office and the like. Features 15, also referred to as landmarks, represent objects visible within environment 2, such as rocks, trees, signs, walls, stairs, chairs, tables, and the like. Features 15 may be moving or stationary objects within environment 2.

VINS 10 represents any mobile device that implements the techniques described herein. VINS 10 may be, for example, a robot, mobile sensing platform, a mobile phone, a laptop, a tablet computer, a vehicle, such as an automobile, ship, unmanned aerial vehicle, or drone, a wearable device such as smart glasses and the like. The increasing range of sensing capabilities offered by modern mobile devices, such as cell phones and tables, as well as their increasing computational resources make them ideal for applying VINS. In some implementations, the techniques described herein may be used within environments having GPS or similar signals and may provide supplemental localization and mapping information.

As one example, VINS 10 may be an autonomous robot although, as discussed above, VINS 10 may take the form of other devices that implement the techniques described herein. While traversing environment 2, the image sources of VINS 10 produce image data at discrete time instances along the trajectory within the three-dimensional (3D) environment, where the image data captures features 15 within the 3D environment at each of the time instances. In addition, IMUs of VINS 10 produces IMU data indicative of a dynamic motion of VINS 10.

As described in detail herein, VINS 10 includes a hardware-based computing platform that implements an estimator that fuses the image data and the IMU data to perform localization of VINS 10 within environment 10. In general, the estimator process image data 14 and IMU data 18 to estimate the 3D IMU pose and velocity together with the time-varying IMU biases, camera rolling shutter and IMU-camera time synchronization and to produce, based on the captured image data, estimates for poses of VINS 10 along the trajectory and, in some cases, a position and orientation within an overall map of the environment. In some examples, the map includes positions of features that VINS 10 has observed in the environment. Utilizing these techniques, VINS 10 may navigate environment 2 and, in some cases, may construct or augment the mapping information for the environment including the positions of features 15. In one example, the map may be constructed using cooperative mapping techniques described in U.S. Provisional Patent Application 62/341,237, filed May 25, 2016, entitled "RESOURCE-AWARE LARGE-SCALE COOPERATIVE 3D MAPPING USING MULTIPLE MOBILE DEVICES," the entire contents of which are incorporated herein by reference.

The estimator of VINS 10 may operate according to different types of estimators. For example, in an example implementation, VINS 10 implements a Multi-state Constraint Kalman Filter (MSC-KF) as described in U.S. Pat. No. 9,243,916, the entire contents of which are incorporated herein. In other examples, VINS 10 implements an inverse, sliding-window filter (ISWF) as described in U.S. patent application Ser. No. 14/796,574, filed Jul. 10, 2015, entitled "INVERSE SLIDING-WINDOW FILTERS FOR VISION-AIDED INERTIAL NAVIGATION SYSTEMS," the entire contents of which is incorporated herein by reference. In other examples, VINS 10 implements a sliding-window Iterative Kalman Smoother (IKS) as described U.S. patent application Ser. No. 15/130,736, filed Apr. 15, 2016, entitled "ITERATIVE KALMAN SMOOTHER FOR ROBUST 3D LOCALIZATION FOR VISION-AIDED INERTIAL NAVIGATION," the entire contents of which are incorporated herein.

In one example, as described herein, the estimator implements a square-root inverse form of a Schmidt-Kalman Filter (SR-ISF) for localization within environment 10. In one example implementation, as compared to a regular MSCKF, which maintains the covariance matrix, the SR-ISF maintains the Cholesky factor of a Hessian matrix. In linear algebra, the Cholesky factorization is a decomposition of a symmetric positive definite matrix (as is the case of the covariance matrix here) into the product of a lower-triangular matrix (the Cholesky factor) and its transpose. In this context, as a consequence of maintaining the uncertainty data as the Cholesky factor of a Hessian matrix, as an SR-ISF-based estimator computes state estimates, the size of the state vector increases approximately linearly with respect to processing and memory requirements. Furthermore, the use of this factor may allow for better numerical accuracy of the algorithm as compared to maintaining the covariance matrix itself. Further example details are described in Gene H. Golub and Charles F. Van Loan, Matrix Computations, 3rd Ed., Johns Hopkins University Press, 1996, the entire contents of which are incorporated herein by reference. Further example details describing SR-ISFs are described in Kejian Wu and Stergios Roumeliotis, Multiple Autonomous Robotic Systems Laboratory, Department of Computer Science and Engineering, University of Minnesota, The Square-Root Inverse Schmidt Filter, Technical Report No. 2016-003, September 2016, the entire content of which is incorporated herein by reference. Therefore, VINS 10 may efficiently compute, based on the state estimates for the position and orientation of the frame of reference for each of the plurality of poses along the trajectory, a map of approximate positions of the features observed along the trajectory. Accordingly, VINS 10 may be suitable for large-scale SLAM problems to obtain efficient approximate mapping solutions. Further, VINS 10 may be suitable for SLAM operations on resource-constrained devices, such as mobile devices, or for real-time mapping and navigation.

Figure 2:
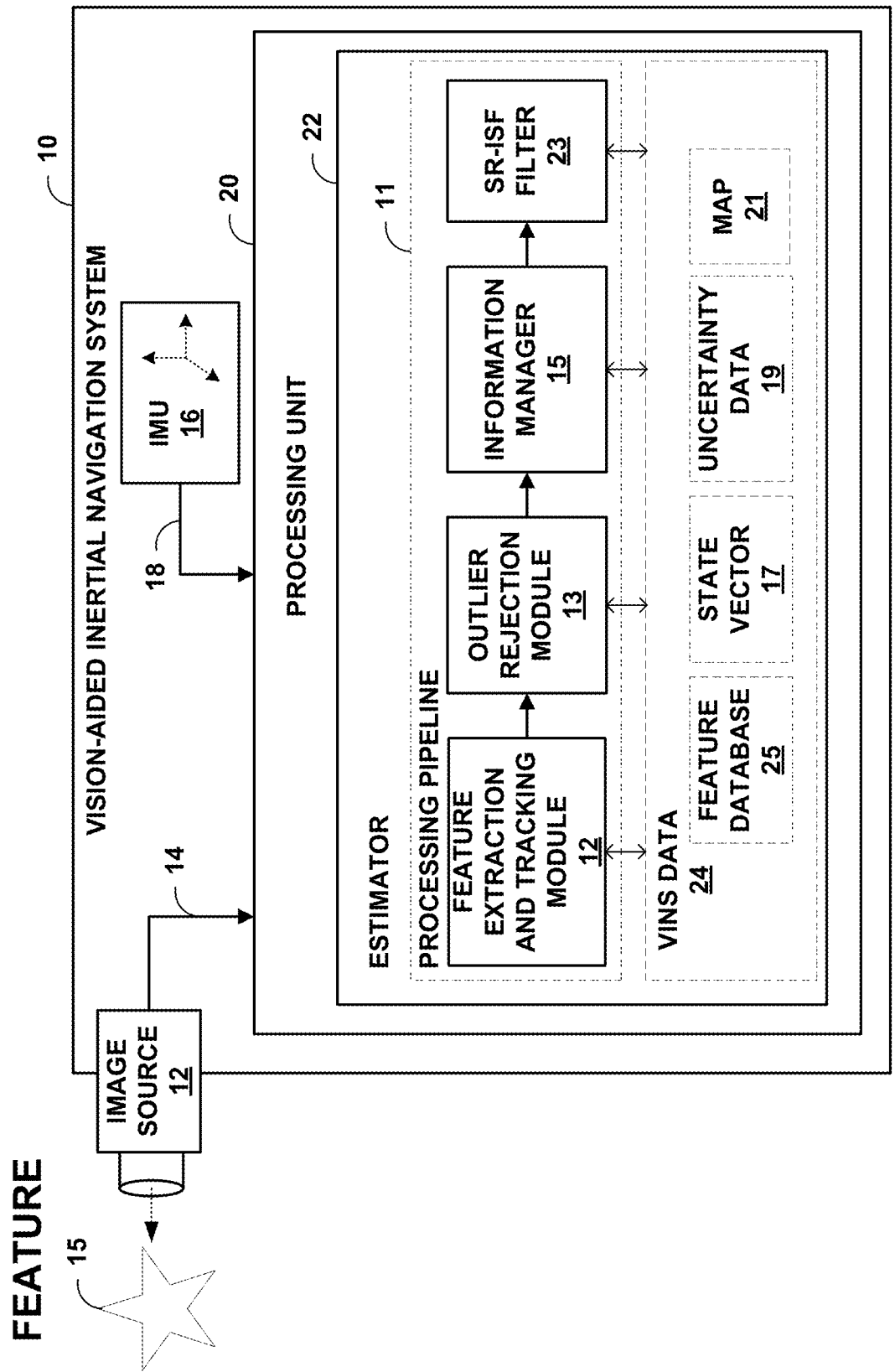
FIG. 2 is a block diagram illustrating an example implementation of the VINS of FIG. 1 in further detail.

FIG. 2 is a block diagram illustrating an example implementation of VINS 10 in further detail. Image source 12 of VINS 10 images an environment in which VINS 10 operates so as to produce image data 14. That is, image source 12 generates image data 14 that captures a number of features visible in the environment. Image source 12 may be, for example, one or more cameras that capture 2D or 3D images, a laser scanner or other optical device that produces a stream of 1D image data, a depth sensor that produces image data indicative of ranges for features within the environment, a stereo vision system or a vision system having multiple cameras to produce 3D information, a Doppler radar and the like. In this way, image data 14 provides exteroceptive information as to the external environment in which VINS 10 operates. Moreover, image source 12 may capture and produce image data 14 at time intervals in accordance one or more clocks associated with the image source. In other words, image source 12 may produce image data 14 at each of a first set of time instances along a trajectory within the three-dimensional (3D) environment, wherein the image data captures features 15 within the 3D environment at each of the first time instances.

IMU 16 produces IMU data 18 indicative of a dynamic motion of VINS 10. IMU 16 may, for example, detect a current acceleration using one or more accelerometers as VINS 10 is translated, and detect the rotational velocity (i.e., the rate of change in rotational attributes like pitch, roll and yaw) using one or more gyroscopes as VINS 10 is rotated. IMU 14 produces IMU data 18 to specify the detected motion. In this way, IMU data 18 provides proprioceptive information as to the VINS 10 own perception of its movement and orientation within the environment. Moreover, IMU 16 may produce IMU data 18 at time intervals in accordance a clock associated with the IMU. In this way, IMU 16 produces IMU data 18 for VINS 10 along the trajectory at a second set of time instances, wherein the IMU data indicates a motion of the VINS along the trajectory. In many cases, IMU 16 may produce IMU data 18 at much faster time intervals than the time intervals at which image source 12 produces image data 14. Moreover, in some cases the time instances for image source 12 and IMU 16 may not be precisely aligned such that a time offset exists between the measurements produced, and such time offset may vary over time. In such cases, VINS 10 may compensate and correct for any misalignment by applying the techniques described in U.S. patent Ser. No. 14/733,468, entitled "EFFICIENT VISION-AIDED INERTIAL NAVIGATION USING A ROLLING-SHUTTER CAMERA WITH INACCURATE TIMESTAMPS," incorporated herein by reference.

In general, estimator 22 fuses image data 14 and IMU data 18 to determine a position and orientation of VINS 10 as well as positions of features 15 as the VINS traverses environment 2. That is, estimator 22 of processing unit 20 process image data 14 and IMU data 18 to compute state estimates for the various degrees of freedom of VINS 10 and, from the state estimates, computes position, orientation, speed, locations of observable features, a map to be used for localization, an odometry or other higher order derivative information represented by VINS data 24. Processing unit 20 may, for example, comprise a hardware-based computing platform having one or more processors that execute software instructions and/or application-specific hardware for implementing the techniques described herein.

In the example of FIG. 2, estimator 22 comprises a processing pipeline 11 for measurements from image source 12 and IMU 16. In this example, processing pipeline 11 includes feature extraction and tracking module 12, outlier rejection module 13, information manager 15 and filter 23.

Feature extraction and tracking module 12 extracts features 15 from image data 14 acquired by image source 12 and stores information describing the features in feature database 25. Feature extraction and tracking module 12 may, for example, perform corner and edge detection to identify features and track features 15 across images using, for example, the Kanade-Lucas-Tomasi (KLT) techniques described in Bruce D. Lucas and Takeo Kanade, *An iterative image registration technique with an application to stereo vision*, In Proc. of the International Joint Conference on Artificial Intelligence, pages 674-679, Vancouver, British Columbia, Aug. 24-28, 1981, the entire content of which in incorporated herein by reference.

Outlier rejection module 13 provides robust outlier rejection of measurements from image source 12 and IMU 16. For example, outlier rejection module may apply a Mahalanobis distance tests to the feature measurements to identify and reject outliers. As one example, outlier rejection module 13 may apply a 2-Point Random sample consensus (RANSAC) technique described in Laurent Kneip, Margarita Chli, and Roland Siegwart, *Robust Real-Time Visual Odometry with a Single Camera and an Imu*, In Proc. of the British Machine Vision Conference, pages 16.1-16.11, Dundee, Scotland, Aug. 29-Sep. 2, 2011, the entire content of which in incorporated herein by reference.

Information manager 15 selects features from feature database 15 and feeds measurements for the selected features to filer 23, which may perform simultaneous localization of the position and orientation for VINS 10 within environment 2 by iteratively optimizing over measurements throughout trajectory, which can be computationally extensive. As described herein, estimator 22 implements SR-ISF filter 23 that iteratively updates predicted state estimates over a bounded size sliding window of state estimates for poses of VINS 10 and positions of features 15 in real-time as new image data 14 and IMU data 18 are obtained. That is, by implementing the SR-ISF filtering approach, estimator 22 of VINS 10 marginalizes out past state estimates and measurements through the sliding window so as to perform simultaneous localization of the position and orientation for VINS 10 as VINS 10 traverses environment 2 for SLAM operations.

In one example implementation, filter 23 of estimator 22 recursively operates on the streams of image data 14 and IMU data 18 to compute a sliding window of predicted estimates for the state variables maintained within state vector 17 along with uncertainty data 19 representing the respective uncertainties in the form of one or more uncertainty matrices, which may take the form of one or more Cholesky factors of Hessian matrices for a square-root inverse Schmidt-Kalman Filter (SR-ISF).

Estimator 22 may implement filter 23 such that uncertainty data 19 takes the form of a square root factor, e.g., a Cholesky factor, of a Hessian matrix that contains estimates of the uncertainty of each predicted state estimate in state vector 17 as well as a correlation between uncertainties. When a subsequent measurement is observed from either image data 14 or IMU data 18, filter 23 updates the sliding window of predicted state estimates with state vector 17 and the uncertainty data 19. In general, estimator 22 operates in real-time using the present input measurements of image data 14 and IMU data 18 and the previously calculated state estimates and its uncertainty matrix. In general, when new image data 14 or IMU data 18 is received, filter 23 projects the measurements as the data arrives onto the state estimates within state vector 17 to re-compute the predicted states and to update respective uncertainty data 19 for each state estimate. Any difference between the predicted state estimates as computed by estimator 22 and the actual feature measurements is referred to as a residual.

In some examples, estimator 22 iteratively processes measurements from image data 14 and IMU data 18 to update estimates only for keyframes (key robot/device poses) and key landmarks while also exploiting information (e.g., visual observations and odometry measurements) available to the non-keyframes along the trajectory. In such example implementations, filter 23 projects new measurements onto the keyframes, by generating consistent pose (position and orientation) constraints between keyframes. As used herein, the term keyframes refers to the individual poses of the VINS 10 for which position and orientation of the VINS are to be estimated. In contrast, the term non-keyframes refers to intermediate poses between keyframes and for which, in some examples, complete state estimates of the VINS are not computed. In these example implementations, information from non-keyframes, acquired between keyframes, is not discarded. Instead, this information is projected on to estimates in the state vector associated with the keyframes, in order to generate tight constraints between the keyframes. For example, information from a non-keyframe may be projected onto a preceding keyframe to compute relative position and orientation constraints between the preceding keyframe and the non-keyframe. Further examples of such implementations are described in U.S. patent application Ser. No. 14/271,971, entitled "CONSTRAINED KEY FRAME LOCALIZATION AND MAPPING FOR VISION-AIDED INERTIAL NAVIGATION," filed May 7, 2014, the entire contents of which are incorporated herein by reference.

Estimator 22 processes inertial and visual measurements to compute, based on the image data and the IMU data, state estimates for at least a position and orientation of VINS 10 for a plurality of poses of the VINS along the trajectory. That is, estimator 22 process image data 14 and IMU data 18 to update within state vector 17 estimates for the 3D IMU pose and velocity together with the time-varying IMU biases so as to determining the position and orientation of estimator 22 within the environment represented by map 21, where the map may be initially constructed using the cooperative mapping information described herein. Estimator 22 may, in accordance with the techniques described herein, apply estimation techniques that compute state estimates for 3D poses of IMU 16 at each of the first set of time instances associated with capture of the IMU data and 3D poses of image source 12 at each of the second set of time instances associated with capture of the image data along the trajectory.

In this example implementation, VINS 10 provides two sources of information: motion information (IMU data 18) from an IMU 14, and image data 14 (e.g., feature observations) from image source 12. Estimator 22 may classify the features observations into two main categories: SLAM features for which estimates are included and updated within a complex system state vector 17 maintained by estimator 22, and multi-state constraint Kalman filter (MSCKF) features for which the estimator has determined to exclude corresponding estimates in the state vector but instead used the features to generate constraints that geometrically constrain the states for the poses of VINS 10 from which the MSCKF feature was observed. That is, rather than maintain state estimates for positions of each observed feature 15 within its internal state vector, the estimator may group the images per feature and elect to exclude state estimates for one or more of those features (i.e., MSCKF features) from its state vector that were observed from multiple poses along the trajectory. For these features excluded from the state vector, referred to as MSCKF features, estimator 22 computes geometric constraints that constrain state estimates for other poses within the sliding window state vector and that are used to compute state updates for those state estimates within the state vector. In this way, MSCKF features relate and constrain estimated poses within the sliding window as VINS 10 moves along a trajectory. They require less computations than SLAM features since their feature states are not directly estimated. Further example details of an estimator that computes constraints for features 15 observed from multiple poses and utilizes constraints to compute the state estimates for VINS 10 while excluding the MSCKF features from the state vector are described in U.S. patent application Ser. No. 12/383,371, entitled "VISION-AIDED INERTIAL NAVIGATION," the entire contents of which are incorporated herein by reference.

Conventional systems may use a Schmidt-Kalman filter to generate constraints for features 15 observed from multiple poses and utilizes constraints to compute the state estimates for VINS 10. For an optimal Schmidt-Kalman filter, the state vector to be estimated is denoted as x, which comprises camera poses and features and extends by new states as time goes by. At every step, estimator 22 has a prior cost term of the current state vector x, $\|R(x-\hat{x})\|^2$, where R is an upper-triangular square matrix and $\hat{x}$ is the current estimate of x. As new measurements arrive, they contribute another cost term, $\|H(x-\hat{x})-r\|^2$, and the new estimate of x, $\hat{x}^\oplus$, is found by minimizing the cost function:

$$C = \|R(x-\hat{x})\|^2 + \|H(x-\hat{x})-r\|^2$$

$$\hat{x}^\oplus = \operatorname*{argmin}_{x} C$$

The optimal solution of $$\operatorname*{argmin}_{x} C$$

can be computed by QR factorization, as $$C = \left\| \begin{bmatrix} R \\ H \end{bmatrix}(x-\hat{x}) - \begin{bmatrix} 0 \\ r \end{bmatrix} \right\|^2 = \left\| \begin{bmatrix} R^\oplus \\ 0 \end{bmatrix}(x-\hat{x}) - \begin{bmatrix} r^\oplus \\ e \end{bmatrix} \right\|^2 \Rightarrow \hat{x}^\oplus = R^{\oplus^{-1}} r^\oplus$$

where estimator 22 performs the following QR factorization:

$$\begin{bmatrix} R \\ H \end{bmatrix} = Q \begin{bmatrix} R^\oplus \\ 0 \end{bmatrix}, \begin{bmatrix} r^\oplus \\ e \end{bmatrix} \triangleq Q^T \begin{bmatrix} 0 \\ r \end{bmatrix}$$

One advantage of a Schmidt-Kalman filter is its optimality in minimizing the mean square error. Additionally, a Schmidt-Kalman filter is very efficient during the exploration phase if the states in x follow a chronological order. Specially, when only local feature track measurements are available the QR needs to involve only the right-bottom part of R, which corresponds to recent states; thus the cost is O(1) in terms of the size of x. However, a Schmidt-Kalman filter may become inefficient when processing loop-closure measurements involving both recent and past states. This is because the size of the matrices involved in the QR factorization increases to at least linear in the size of x, regardless of the state order selected for it. Because this becomes prohibitively expensive, especially when navigating in large areas, the techniques of the disclosure provide for a SR-ISF filter 23 as an alternative so as to implement an approximated estimator that reduces the computational cost, while preserving consistency.

In accordance with the techniques of the disclosure, in one example, estimator 22 implements a square-root inverse form of a Schmidt-Kalman Filter (SR-ISF) for localization within environment 10. The estimator may, for example, exclude from the state vector state information representing estimates for positions within the environment for the features that were each observed from the multiple poses and for which the one or more constraints were computed. Moreover, the Hessian matrix, from which the square root factor is determined, excludes data for the features that were each observed from the multiple poses and for which the one or more constraints were computed.

As mentioned above, by maintaining the uncertainty data as the Cholesky factor of the Hessian matrix, the techniques described herein may allow for the size of the state vector increases approximately linearly with respect to processing and memory requirements as the SR-ISF-based estimator computes state estimates. Furthermore, the techniques described herein achieve better numerical accuracy as compared to maintaining the covariance matrix itself. This may provide a significant advantage over other estimators in terms of computational cost and complexity such that the SR-ISF-based estimator may be suitable for large-scale SLAM problems to obtain efficient approximate mapping solutions. As a result of maintaining the Cholesky factor, the steps (propagation, update, and marginalization) involved in the estimation computation are modified as described herein. This disclosure presents the derivation to these steps, which together provide the novel techniques.

In one example, estimator 22 implements a consistent approximation of the SR-ISF filtering approach. In this example, estimator 22 updates optimally only a subset of the states (e.g., recent poses and features) and their corresponding covariance and cross correlation terms, while leaving the rest (e.g., past poses and features) unaltered. By doing so, the computational cost is reduced from quadratic to linear in the (potentially very large) size of unchanged states. Meanwhile, the uncertainty of the past states is correctly accounted for to guarantee consistent estimates.

In one example, estimator 22 implements filter 23 implements an exact equivalent of the Schmidt-Kalman filter in its square-root inverse form (referred to herein as "exact SR-ISF filter 23"), i.e., by maintaining the Cholesky factor of the uncertainty data (e.g., in a Hessian matrix), because the corresponding portion of the information factor does not change.

To implement exact SR-ISF filter 23, state vector x is divided into two parts: $x_1$ and $x_2$. Now the QR factorization may be written as:

$$\|R(x-\hat{x})\|^2 = \left\| \begin{bmatrix} R_{11} & R_{12} \\ & R_{22} \end{bmatrix} \begin{bmatrix} x_1 - \hat{x}_1 \\ x_2 - \hat{x}_2 \end{bmatrix} \right\|^2$$

Estimator 22 may use the measurements to update the estimate of $x_1$ to $\hat{x}_1^\oplus$ but keep $\hat{x}_2$ the same. By doing so, the prior term becomes:

$$\left\| \begin{bmatrix} R_{11}^{\oplus} & R_{12}^{\oplus} \\ & R_{22} \end{bmatrix} \begin{bmatrix} x_1 - \hat{x}_1^{\oplus} \\ x_2 - \hat{x}_2 \end{bmatrix} \right\|^2$$

A property of the Schmidt approximation in SR-ISF filter 22 is that $R_{22}$ remains the same, which does not hold if we change the state order (e.g., update $x_2$ but not $x_1$). For this reason, it is preferable to put the states to be updated on the upper part of the state vector x. In practice, estimator 22 may typically focus more on recent states than past states, so the states are organized in reverse chronological order in order to apply the Schmidt approximation. This is in contrast to the preferred state order for the case of the optimal Schmidt-Kalman estimator described above.

The implementation of filter 23 as exact SR-ISF filter 23 may be performed in accordance with the following algorithm:

---
Algorithm 1: Exact SR-ISF filter
---

1. Input: Current state estimate $\hat{x}$, prior information factor R, and residual $r_0$, pre-whitened measurement Jacobian H, and residual r
2. Procedure: Update
3. Perform the in-place QR of $\begin{bmatrix} R_{11} \\ H_1 \end{bmatrix}$ as $\begin{bmatrix} R_{11} & \vdots & R_{12} & \vdots & r_0^1 \\ H_1 & \vdots & H_2 & \vdots & r \end{bmatrix} \xrightarrow{QR} \begin{bmatrix} \bar{R}_{11} & \vdots & \bar{R}_{12} & \vdots & \bar{r}_1 \\ 0 & \vdots & \bar{H}_2 & \vdots & \bar{r}_2 \end{bmatrix}$
4. Compute $[\bar{A}_1 \vdots \bar{A}_2] \leftarrow R_{22}^{-T}[R_{12}^T \vdots H_2^T]$, then compute $\bar{B}_1 \leftarrow \bar{A}_1^T \bar{A}_2$ and $\bar{B}_2 \leftarrow I + \bar{A}_2^T \bar{A}_2$
5. Perform the in-place QR of $\bar{B}_2$ as: $[\bar{B}_2 \vdots \bar{H}_2 \vdots \bar{r}_2] \xrightarrow{QR} [\bar{R}_{B_2} \vdots \bar{H}_2' \vdots \bar{r}_2']$
6. Perform the in-place QR of $\begin{bmatrix} \bar{B}_1 \\ \bar{R}_{B_2} \end{bmatrix}$ as $\begin{bmatrix} \bar{B}_1 & \vdots & \bar{R}_{11} & \vdots & \bar{R}_{12} & \vdots & \bar{r}_1 \\ \bar{R}_{B_2} & \vdots & 0 & \vdots & \bar{H}_2' & \vdots & \bar{r}_2' \end{bmatrix} \xrightarrow{QR} \begin{bmatrix} 0 & \vdots & R_{11}^s & \vdots & R_{12}^s & \vdots & r^s \\ R_{B_2}' & \vdots & J_1^s & \vdots & J_2^s & \vdots & r_J^s \end{bmatrix}$ by
   Givens rotations following ($R_1$)
7. Information Factor update: $R^s \leftarrow \begin{bmatrix} R_{11}^s & R_{12}^s \\ 0 & R_{22} \end{bmatrix}$
8. State update: $\hat{x}^s \leftarrow \begin{bmatrix} \hat{x}_1 + R_{11}^{s \, -1} r^s \\ \hat{x}_2 \end{bmatrix}$
9. End Procedure
10. Output: Updated Schmidt state estimate $\hat{x}^s$ and information factor $R^s$

---

However, the use of exact SR-ISF filter 23 may not provide increased computational saving as compared to an optimal solver. Moreover, the involved operations introduce a large number of fill-ins, leading to an almost dense information factor. Eventually, the use of exact SR-ISF filter 23 may make the system too slow, and hence unsuitable for real-time long-term SLAM.

In other examples, estimator 22 implements filter 23 as a resource-aware approximation of the exact square-root inverse form of the Schmidt-Kalman estimator (referred to herein as an "approximated SR-ISF filter 23"). In this example, approximated SR-ISF filter 23 drops a certain portion of the available information, so that the past states as well as a portion of the information factor corresponding to the past states remain unaltered, while at the same time, the recent states are updated only approximately, instead of optimally, so as to reduce both the processing cost and the factor fill-ins. As a result, approximated SR-ISF filter 23 achieves both computational and memory efficiency by keeping the information factor sparse. Meanwhile, approximated SR-ISF filter 23 is a consistent approximation to the optimal approach, as approximated SR-ISF filter 23 only drops information, instead of assuming any state to be perfectly known. More importantly, approximated SR-ISF filter 23 is resource-aware, i.e., it allows trading accuracy for efficiency, by adjusting the size of the window of the states selected to be updated. In the extreme case, where all states are chosen for an update, approximated SR-ISF filter 23 becomes exactly equivalent to the optimal solver without any information loss.

Approximated SR-ISF filter 23 may be derived by setting $R_{22}$ to infinity. Further, the cost function is rewritten as:

$$C = \left\| \begin{bmatrix} R_{11} & R_{12} \\ H_1 & H_2 \end{bmatrix} \begin{bmatrix} x_1 - \hat{x}_1 \\ x_2 - \hat{x}_2 \end{bmatrix} - \begin{bmatrix} 0 \\ r \end{bmatrix} \right\|^2 + \| R_{22}(x_2 - \hat{x}_2) \|^2 =$$

$$\left\| \begin{bmatrix} R_{11}^{\oplus} & R_{12}^{\oplus} \\ & H_2^{\oplus} \\ & R_{22} \end{bmatrix} \begin{bmatrix} x_1 - \hat{x}_1 \\ x_2 - \hat{x}_2 \end{bmatrix} - \begin{bmatrix} r_1^{\oplus} \\ e_1 \\ 0 \end{bmatrix} \right\|^2$$

where the following QR factorization was performed:

$$\begin{bmatrix} R_{11} \\ H_1 \end{bmatrix} = Q_1 \begin{bmatrix} R_{11}^{\oplus} \\ 0 \end{bmatrix}$$

and

-continued $$\begin{bmatrix} R_{12}^{\oplus} \\ H_2^{\oplus} \end{bmatrix} \triangleq Q_1^T \begin{bmatrix} R_{12} \\ H_2 \end{bmatrix}, \begin{bmatrix} r_1^{\oplus} \\ e \end{bmatrix} \triangleq Q_1^T \begin{bmatrix} 0 \\ r \end{bmatrix}$$

Next, instead of minimizing C, the cost term involving only $x_2$, $\|H_2^{\oplus}(x_2-\hat{x}_2)-e_1\|^2$, is dropped, and the following minimization is performed:

$$\bar{C} = \left\| \begin{bmatrix} R_{11}^{\oplus} & R_{12}^{\oplus} \\ & R_{22} \end{bmatrix} \begin{bmatrix} x_1 - \hat{x}_1 \\ x_2 - \hat{x}_2 \end{bmatrix} - \begin{bmatrix} r_1^{\oplus} \\ 0 \end{bmatrix} \right\|^2$$

Finally, the estimate of $x_1$ is updated by setting:

$$\hat{x}_1^{\oplus} = \underset{x_1}{\operatorname{argmin}\bar{C}} = \hat{x}_1 + R_{11}^{\oplus^{-1}} r_1^{\oplus}$$

availability of computing resources. Specifically, during re-localization, estimator 22 may use approximated SR-ISF filter 23 with a small-size $x_1$ for an approximate but efficient solution or may set $x_1=x$ to obtain an accurate global adjustment if it is the first loop-closure event. Furthermore, this global adjustment may be split into two steps, wherein during the first step, estimator 22 employs approximated SR-ISF filter 23 with a small sized $x_1$, while during the second step, which may be run independently in the backend thread, estimator 22 optimizes over $x_2$. Through this process, the frontend maintains its real-time localization capability, while the backend allows taking advantage of loop-closure events after long periods of exploration. Further, the use of approximated SR-ISF filter 23 may allow estimator 22 to achieve real-time performance while maintaining consistency.

The implementation of filter 23 as approximated SR-ISF filter 23 may be performed in accordance with the following algorithm:

---
Algorithm 2: Approximated SR-ISF filter
---

1. Input: Current state estimate $\hat{x}$, prior information factor R, and residual $r_0$, pre-whitened measurement Jacobian H, and residual r
2. Procedure: Update
3. Perform the in-place QR of $\begin{bmatrix} R_{11} \\ H_1 \end{bmatrix}$ as $\begin{bmatrix} R_{11} & \vdots & R_{12} & \vdots & r_0^1 \\ H_1 & \vdots & H_2 & \vdots & r \end{bmatrix} \xrightarrow{QR} \begin{bmatrix} \bar{R}_{11} & \vdots & \bar{R}_{12} & \vdots & \bar{r}_1 \\ 0 & \vdots & \bar{H}_2 & \vdots & \bar{r}_2 \end{bmatrix}$ 4. Information Factor update: $R^r \leftarrow \begin{bmatrix} \bar{R}_{11} & \bar{R}_{12} \\ 0 & R_{22} \end{bmatrix}$ 5. State update: $\hat{x}^r \leftarrow \begin{bmatrix} \hat{x}_1 + \bar{R}_{11}^{-1} \bar{r}_1 \\ \hat{x}_2 \end{bmatrix}$ 6. End Procedure
7. Output: Updated Schmidt state estimate $\hat{x}^r$ and information factor $R^r$

---

Approximated SR-ISF filter 23 is consistent because it does not assume any state as perfectly known. Instead, approximated SR-ISF filter 23 only drops information (in this case, the term $\|H_2^{\oplus}(x_2-\hat{x}_2)-e_1\|^2$), and correctly updates the cross terms between $x_1$ and $x_2$. As compared to exact SR-ISF filter 23, approximated SR-ISF filter 23 computes an approximate estimate for $x_1$, whose accuracy loss is negligible when the estimate of $x_2$ is accurate. In the extreme case, when the uncertainty of $x_2$ goes to zero, approximated SR-ISF filter 23 results in the optimal solution for $x_1$, as exact SR-ISF filter 23. For this reason, in practice, estimator 22 sets $x_2$ to be states with low uncertainty. On the other hand, SR-ISF filter 23 is significantly more efficient than exact SR-ISF filter 23 since the cost of the QR is cubic in the size of $x_1$ (instead of x), and introduces no extra fill-ins, thus keeping R sparse. If $x_1$ contains a small number of states (e.g., a window of recent camera poses and features), the cost is O(1) in terms of the size of x. Although the column size of $R_{12}^{\oplus}$ is the same as the size of $x_2$ and can be comparable to that of x, it is sparse in the context of SLAM. As a result, computing $R_{12}^{\oplus}$ is also O(1).

Moreover, approximated SR-ISF filter 23 can trade accuracy for speed by adjusting the size of $x_1$, according to the During the first exploration, in order to realize the efficiency of an optimal Schmidt-Kalman estimator, estimator 22 organizes states in chronological order. Moreover, estimator 22 uses approximated SR-ISF filter 23 with $x_1=x$, which in this case is equivalent to the optimal Schmidt-Kalman estimator. To do so, the state vector is denoted as $x_E = [x_{E1}^T x_{E2}^T]^T$, where $x_{E2}$ are the recent states involved in the local feature track measurements. The cost function to minimize is:

$$C_E = \left\| \begin{bmatrix} R_{E11} & R_{E12} \\ & R_{E22} \end{bmatrix} \begin{bmatrix} x_{E1} - \hat{x}_{E1} \\ x_{E2} - \hat{x}_{E2} \end{bmatrix} \right\|^2 + \|H_{E2}(x_{E2} - \hat{x}_{E2}) - r_e\|^2$$

where the first term is the prior obtained from the previous step and the second term corresponds to the new measurements at the current step.

Then, the optimal solution is:

$$\hat{x}_{E2}^{\oplus} = \hat{x}_{E2} + R_{E22}^{\oplus^{-1}} r_E^{\oplus}$$

$$\hat{x}_{E1}^{\oplus} = \hat{x}_{E1} - R_{11}^{-1} R_{12} R_{E22}^{\oplus^{-1}} r_E^{\oplus}$$

which results by rewriting (12) as:

$$C_E = \left\| \begin{bmatrix} R_{E11} & R_{E12} \\ & R_{E22}^{\oplus} \end{bmatrix} \begin{bmatrix} x_{E1} - \hat{x}_{E1}^{\oplus} \\ x_{E2} - \hat{x}_{E2}^{\oplus} \end{bmatrix} \right\|^2 + \|e_E\|^2$$

where $R_{E22}^{\oplus}$ is computed by the following QR factorization:

$$\begin{bmatrix} R_{E22} \\ H_{E2} \end{bmatrix} = Q_E \begin{bmatrix} R_{E22}^{\oplus} \\ 0 \end{bmatrix}, \begin{bmatrix} r_E^{\oplus} \\ e_E \end{bmatrix} = Q_E^T \begin{bmatrix} 0 \\ r_E \end{bmatrix}$$

These steps are actually analogous to those described above, and similarly, the cost is independent of $x_E$ and depends on the size of $x_{E2}$. Estimator 22 improves speed during exploration by limiting both the number of features processed at every step and the length of the features based on a preselected size of $x_{E2}$.

At this point, VINS 10 is assumed to be in re-localization mode and about to enter into exploration mode (i.e., estimator 22 receives no more loop closure measurements). To do so, estimator 22 converts the prior term from re-localization mode to the form necessary for exploration. While in re-localization, VINS 10 has a prior term in the form of $$C_N = \left\| \begin{bmatrix} R'_{N11} & R'_{N12} \\ & R'_{N22} \end{bmatrix} \begin{bmatrix} x'_N - \hat{x}'_N \\ x'_M - \hat{x}'_M \end{bmatrix} \right\|^2$$

where the state vector is divided into two parts, $x'_N$ and $x'_M$. All the states are in reverse chronological order, as the result of the operations in the re-localization mode, and $x'_N$ (we use the superscript "'" to denote reverse chronological state order) contains the recent states not involved in any loop closure measurements.

The new exploration phase begins with the states in $x'_N$, which we need to change to $x_N$ that has chronological order, by $$x_N \triangleq P_N x'_N,$$

where $P_N$ a permutation matrix. Subsequently, we perform a QR factorization to make its factor upper-triangular again, which is of constant cost, regardless the size of the whole state vector since $R'_{N12}$ is sparse. After these operations, $C_N$ can be written as:

$$C_N = \left\| [ R_{N11} \ R_{N12} ] \begin{bmatrix} x_N - \hat{x}_N \\ x'_M - \hat{x}'_M \end{bmatrix} \right\|^2 + C_M,$$

where $$C_M \triangleq \|R_M(x'_M - \hat{x}'_M)\|^2, R_M \triangleq R'_{N12}$$

Note that the states in $x'_M$ are considered as an old map, which estimator 22 will update during exploration, so $C_M$ is not used temporarily. A new map (comprising new camera poses and features) begins with $x_{N1}$, while $R_{N11}$ represents its information. In addition, $R_{N12}$ is kept to maintain the correlation information between the new and the old maps.

When VINS 10 is in exploration mode, estimator 22 may use approximated SR-ISF filter 23 not only to estimate the states of the new map built in the current exploration phase, but also to maintain correlations between the states of the new map and the states of the old map. To do so, estimator 22 performs similar operations on the states of the new map. Additionally, estimator 22 performs QR on the correlation term $F_E$ (extended from $R_{N12}$), and drops the cost term $\|F_{E3}^{\oplus}(x'_M - \hat{x}'_M) - e_E\|^2$ involving only the old map. Note that only the lower of part of $F_E$, $F_{E2}$ needs to be updated, which has a bounded number of dense columns. Thus, the cost for the general case of exploration is also constant when employing approximated SR-ISF filter 23.

In one example, VINS 10 is in exploration mode and loop closure measurements cause VINS 10 to switch to re-localization mode. Estimator 22 may employ approximated SR-ISF filter 23 to efficiently process loop closure measurements and obtain global correction. A general case is set forth below where a new map is being built in the current exploration while an old map against which the loop closure is made has been previously computed.

Before entering re-localization, VINS 10 performs a transition step so that the states and cost terms are organized in the way the re-localization mode requires them. Specifically, right before switching to re-localization mode, the prior term is:

$$C_L = \|R_L(x_L - \hat{x}_L) + F_L(x'_M - \hat{x}'_M)\|^2 + C_M$$

where $x_L$ comprises the states in the current map which are in chronological order. Estimator 22 changes its state order to reverse chronological order by defining $$x'_L \triangleq P_L x_L,$$

where $P_L$ is permutation matrix. Then, estimator 22 applies the permutation and performs a QR factorization to make the corresponding $R_L$ upper-triangular again. Next, estimator 22 splits $x'_L$ into two parts: $x'_{L1}$ includes recent states to be maintained by the frontend thread, while $x'_{L2}$ will be combined with $x'_M$ and optimized by the backend thread $$\left( x'_B \triangleq [ x'^T_{L2} \ x'^T_M ]^T \right).$$

Adding the cost term from the measurements to $C_L$, the cost function during this transition step becomes:

$$C_T = \left\| \begin{bmatrix} R_{T11} & R_{T12} \\ & R_{T22} \end{bmatrix} \begin{bmatrix} x'_{L1} - \hat{x}'_{L1} \\ x'_B - \hat{x}'_B \end{bmatrix} \right\|^2 + \|H_{T1}(x'_{L1} - \hat{x}'_{L1}) + H_{T2}(x'_B - \hat{x}'_B) - r_T\|^2$$

Next, estimator 22 employs approximated SR-ISF filter 23 to update $x'_{L1}$ only, resulting in:

$$C_T = \left\| \begin{bmatrix} R_{T11}^{\oplus} & R_{T12}^{\oplus} \\ & R_{T22}^{\oplus} \\ & H_{T2}^{\oplus} \end{bmatrix} \begin{bmatrix} x'_{L1} - \hat{x}'_{L1} \\ x'_B - \hat{x}'_B \end{bmatrix} - \begin{bmatrix} r_T^{\oplus} \\ 0 \\ e_T \end{bmatrix} \right\|^2 = C_F + C_B,$$

where:

$$C_F \triangleq \|R_{T11}^{\oplus}(x'_{L1} - \hat{x}'^{\oplus}_{L1}) + R_{T12}^{\oplus}(x'_B - \hat{x}'_B)\|^2$$

-continued $$\hat{x}_{L1}^{\prime\oplus} \triangleq \hat{x}_{L1}^{\prime} + R_{T11}^{\oplus-1} r_T^{\oplus}$$

$$C_B \triangleq \left\| \begin{bmatrix} H_T^{\oplus} \\ R_{T22} \end{bmatrix} (x_B^{\prime} - \hat{x}_B^{\prime}) - \begin{bmatrix} e_T \\ 0 \end{bmatrix} \right\|^2$$

In the frontend thread, estimator 22 extends $C_F$ to include new states. Estimator 22 uses $C_F$ to update recent states, while the estimate of $x'_B$ will not change. In the backend thread, estimator 22 minimizes $C_B$ to perform a global correction on the past states in $x'_B$. This transition step uses two QRs, one for changing the state order and one needed by approximated SR-ISF filter 23. In practice, the frontend thread only changes the state order of $x'_{L1}$ and then performs a single QR to compute $R_{T11}^{\oplus}$ and $R_{T12}^{\oplus}$ directly. The remaining processing is performed by the backend thread and thus the cost for the frontend is constant.

After switching to re-localization, in the frontend thread, estimator 22 employs both local feature tracks and loop closure measurements to update only a window of recent states using approximated SR-ISF filter 23. Specifically, the cost function when in re-localization is $$C_R = C_B + \left\| \begin{bmatrix} R_{R11} & R_{R12} \\ & R_{R22} \end{bmatrix} \begin{bmatrix} x'_{R1} - \hat{x}'_{R1} \\ x'_{R2} - \hat{x}'_{R2} \end{bmatrix} \right\|^2 + \left\| \begin{bmatrix} H_{R1} & H_{R2} \end{bmatrix} \begin{bmatrix} x'_{R1} - \hat{x}'_{R1} \\ x'_{R2} - \hat{x}'_{R2} \end{bmatrix} - r_R \right\|^2$$

The variable $x'_{R1}$ contains the recent states to be updated at the current step. The variable $x'_{R2}$, which is not to be updated, contains the states being optimized in the backend thread ($x'_B$) as well as past states added to the state vector by the frontend thread after the backend thread started. $H_{R1}$ and $H_{R2}$ are both nonzero because estimator 22 considers both local feature tracks and loop closure measurements. The variable $C_B$ is the cost function minimized by the backend and not used in the frontend. The frontend employs approximated SR-ISF filter 23 to update $x'_{R2}$ by first operating on $C_R$ as follows:

$$C_R = \left\| \begin{bmatrix} R_{R11}^{\oplus} & R_{R12}^{\oplus} \\ & H_{R2}^{\oplus} \end{bmatrix} \begin{bmatrix} x'_{R1} - \hat{x}'_{R1} \\ x'_{R2} - \hat{x}'_{R2} \end{bmatrix} - \begin{bmatrix} r_R^{\oplus} \\ e_R \end{bmatrix} \right\|^2 + \|R_{R22}(x'_{R2} - \hat{x}'_{R2})\|^2 + C_B$$

The frontend thread then drops $\|H_{R2}^{\oplus}(x'_{R2} - \hat{x}'_{R2}) - e_R\|^2$ (since estimator 22 does not update $x'_{R2}$) to get $\overline{C}_R$:

$$\overline{C}_R = \left\| \begin{bmatrix} R_{R11}^{\oplus} & R_{R12}^{\oplus} \\ & R_{R22}^{\oplus} \end{bmatrix} \begin{bmatrix} x'_{R1} - \hat{x}'^{\oplus}_{R1} \\ x'_{R2} - \hat{x}'_{R2} \end{bmatrix} \right\|^2 + C_B$$

$$\hat{x}'^{\oplus}_{R1} \triangleq \hat{x}'_{R1} + R_{R11}^{\oplus-1} r_R^{\oplus}$$

The main cost of this operation is computing $R_{R11}^{\oplus}$, $R_{R12}^{\oplus}$, and $H_{R2}^{\oplus}$, which is constant because the size of $x'_{R1}$ and the number of dense columns in $R_{R12}^{\oplus}$ are limited.

The backend thread is designed to update a large number of past states and run in parallel with the frontend thread to avoid blocking it. Specifically, the backend thread employs the cost term that is dropped by approximated SR-ISF filter 23 to update the states not considered by estimator 22. In theory, the backend thread can run the frontend thread performs the approximated SR-ISF filter operation if a global adjustment is necessary and computing resources are available.

In one example, estimator 22 runs the backend thread only once right after the transition step during each re-localization phase and updates all the past states to obtain the optimal solution. Specifically, estimator 22 computes the new estimate of $x'_B$ that minimizes. This may be modeled as a batch least square problem, and solved by Sparse QR. After solving for the new estimate $\hat{x}'^{\oplus}_B$, $C_B$ is written as $$C_B = \|R_B(x'_B - \hat{x}'^{\oplus}_B)\|^2 + \|e_B\|^2$$

The cost is approximately linear in the size of $x'_B$, but it does not block the frontend since they run in parallel.

After the backend thread finishes a global update on past states in $x'_B$, the frontend thread employs this result to update recent states so that they also absorb information from the global correction. Specifically, all the states since the backend started are denoted as $x'_F$, and the frontend keeps a cost term in the form of $\|R_F(x'_F - \hat{x}'_F) + R_F B(x'_B - \hat{x}'_B)\|^2$. Then, estimator 22 combines it with the equation for $C_B$ above to get the cost function:

$$C_{FB} = \left\| \begin{bmatrix} R_F & R_{FB} \\ & R_B \end{bmatrix} \begin{bmatrix} x'_F - \hat{x}'_F \\ x'_B - \hat{x}'_B \end{bmatrix} + \begin{bmatrix} 0 \\ R_B(\hat{x}'_B - \hat{x}'^{\oplus}_B) \end{bmatrix} \right\|^2 =$$

$$\left\| \begin{bmatrix} R_F & R_{FB} \\ & R_B \end{bmatrix} \begin{bmatrix} x'_F - \hat{x}'^{\oplus}_F \\ x'_B - \hat{x}'^{\oplus}_B \end{bmatrix} \right\|^2$$

$$\hat{x}'^{\oplus}_F \triangleq R_F^{\oplus-1} R_{FB}(\hat{x}'_B - \hat{x}'^{\oplus}_B)$$

These operations performed are sparse matrix-vector multiplications and back substitutions, which are efficient and faster than the operations of conventional systems.

As a result of this step, the current states in the frontend thread are immediately corrected using the globally adjusted estimates from the backend thread. This feedback process may be carried out even if VINS 10 has already entered a new area and started a new exploration phase because estimator 22 is solving a single optimization problem (in two separate threads). Thus, in contrast to conventional systems that solve multiple optimization problems independently in different threads, the frontend thread does not have to rely on subsequent map reobservations to obtain information from the backend.

As a result of the estimation, estimator 22 performs localization so as to track the position and orientation of the device (frame of reference) within the environment. VINS 10 may output on a display information based on the estimation, such as information related to one or more estimated positions and/or orientations of VINS 10, a determined trajectory as superimposed on a 2D or 3D graph of the environment or regions thereof, information associated with navigation instructions for a user associated with VINS 10, directional commands based on input specifying one or more desired locations, information specifying an estimated time of arrival, distance traveled, or distance remaining, and the like. For example, such information may be output textually and/or graphically to a display associated with VINS 10, communicated to other display devices, or communicated to remote computing devices.

In some examples, VINS 10 may be a component of or in communication with a virtual reality and/or augmented reality system. For example, VINS 10 may use state estimates computed by estimator 22 to determine and track a location within a virtual reality and/or augmented reality environment, and/or may be used to control output of text, graphics, audio, video or other information within the virtual and/or augmented environment. As one example, VINS 10 uses the computed state estimates to select contextual information and overlay such information with an image or video of a physical environment of a user. For example, if a user views a brick-and-mortar store via a mobile device, such as a smartphone or "smart" apparel (e.g., wearable electronic devices), VINS 10 may use the computed state estimates to identify the store and provide information related to the store to the user. In one example, the information may include operating hours, sales, offers, or promotions, advertisements, marketing information, contact information, prices from competing establishments, and the like. VINS 10 may overlay such information over a display (e.g., a HUD of the mobile device) to interleave real-time imagery or video of the establishment with the contextual images or video.

As another example, VINS 10 may use the computed state estimates to automatically or semi-automatically control navigation of a device, such as a robot, a vehicle, such as an automobile, ship, unmanned aerial vehicle, or drone, or a mobile computing device by outputting the position and/or instructions for navigating the environment, e.g., to a destination. For example, VINS 10 uses the computed state estimates to determine a position and/or orientation of the device within an environment. As a further example, VINS 10 may, based on the computed state estimates, output, to the display of the device, coordinates representing the position of the device within the environment, a bearing of the device, or a direction of the device. VINS 10 may further use the computed state estimates to plot a route to a specific destination. In some examples, VINS 10 may output the route to user via the display.

As another example, VINS 10 may use the computed state estimates to compute a map of approximate positions of the features observed along the trajectory. Accordingly, the SR-ISF-based estimator described herein may allow for a VINS to efficiently approximate solutions to simultaneous localization and mapping (SLAM) solutions on a large scale. Note that VINS 10 may use the computed state estimates to efficiently compute approximate positions of the features observed along the trajectory. While the positions of the features observed along the trajectory are approximated, VINS 10 may build such a map much more efficiently as compared to conventional estimators which compute optimal positions of observed features but are much more computationally expensive, and therefore impractical for use in situations where computational resources are constrained, for example, as is the case for mobile devices or real-time mapping applications. VINS 10 may, based on the computed state estimates, output to the display coordinates representing the position of the device within the environment. VINS 10 may, based on the computed state estimates, output to the display, a map including coordinates representing approximations of positions of the features observed along the trajectory. Thus, by using an SR-ISF estimator as described herein, VINS 10 may be suitable for SLAM operations on resource-constrained devices, such as mobile devices. VINS 10 may further be useful to obtain approximate solutions for real-time mapping and navigation.

Thus, estimator 22 may be employed in various configurations to realize an accurate and efficient visual-inertial SLAM system which maintains a consistent sparse information factor corresponding to all estimated states. In some examples, estimator 22 may enable VINS 10 to alternate between two modes, exploration and re-localization, based on the availability of loop closure measurements. To balance between accuracy and efficiency, in each mode, estimator 22 may use various window sizes and different state orders. In one implementation, VINS 10 incorporates two threads running in parallel: A fast frontend thread for estimating current poses and features at a high frequency, and a lower-rate backend thread for globally adjusting past states to achieve high accuracy.

Further, as compared to conventional systems that solve multiple optimization problems independently in different threads, VINS 10 may always solve a single optimization problem, partitioned into two components, each assigned to one of the two threads. This is enabled through the structure of approximated SR-ISF filter 23, whose approximation allows focusing resources on only a subset of states at a time. As a result, important global corrections from the backend of VINS 10 are immediately reflected onto the frontend estimates, hence improving the current tracking accuracy.

Figure 3:
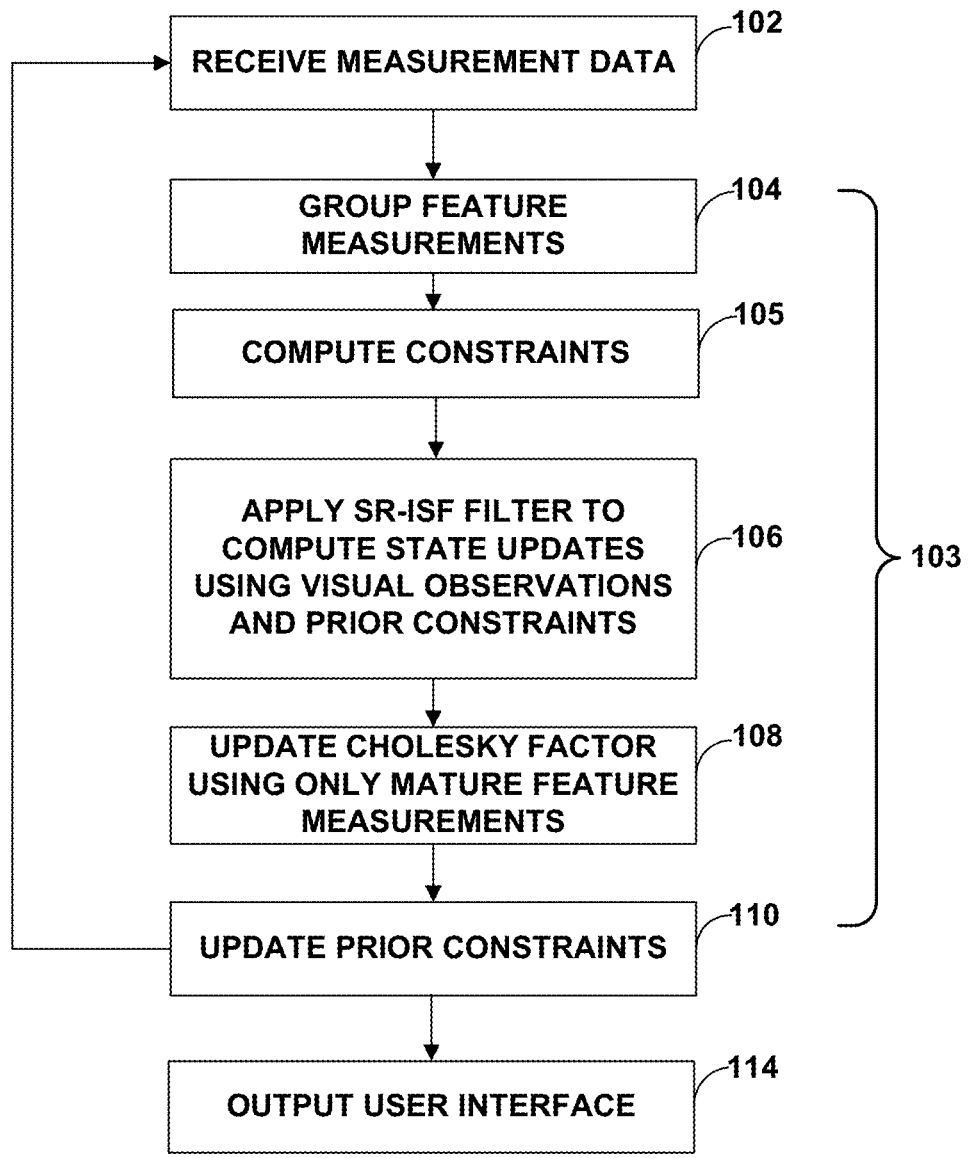
FIG. 3 is a flowchart illustrating example operation of an estimator in accordance with the techniques described herein.

FIG. 3 is a flowchart illustrating an example operation of estimator 22 in accordance with the techniques described herein. The device may, for example, comprise a vision-aided inertial navigation system, mobile device, laptop, table, robot, a vehicle, such as an automobile, ship, unmanned aerial vehicle, or drone, server, cloud-based processing system or other device having a processor or other operating environment for implementing the techniques described herein. For purposes of explanation, FIG. 3 will be described with respect to VINS 10 and estimator 22 of FIG. 1.

During operation, estimator 22 receives measurement data observed along the trajectory (100). That is, estimator 22 receives image data 14 produced by an image source 12 of the vision-aided inertial navigation system 10 for keyframes and non-keyframes along a trajectory of the VINS. In addition, estimator 22 receives, from an inertial measurement unit (IMU) 16, IMU data 18 indicative of motion of VINS 10 along the trajectory for the keyframes and the one or more non-keyframes. In this way, VINS 10 receives and records, within VINS data 24, image data 14 and IMU data 18 for keyframes and non-keyframes along the trajectory. Each keyframe and non-keyframe may correspond to a pose (position and orientation) of VINS 10 including landmarks (features) observed within the environment at that pose. In general, the term keyframes refers to the individual poses of the VINS for which position and orientation of the VINS are to be estimated. In contrast, the term non-keyframes refers to intermediate poses between keyframes and for which complete state estimates of the VINS are not computed. Further example details are described in U.S. patent application Ser. No. 14/271,971, entitled "CONSTRAINED KEY FRAME LOCALIZATION AND MAPPING FOR VISION-AIDED INERTIAL NAVIGATION," the entire contents of which are incorporated herein by reference.

Based on the sliding window of image data and IMU data, estimator 22 applies an SR-ISF-based filter to iteratively update a state vector to determine state estimates (linearization points) for each pose of the VINS and each landmark (103). For example, estimator 22 may update a state vector to compute state estimates for the position and the orientation of the VINS and for one or more landmarks observed from the VINS at various poses along the trajectory. In an example implementation, the state vector includes state estimates (quantities being estimated) for at least a position and orientation of the vision-aided inertial navigation system for a plurality of poses of the VINS along the trajectory. Along with the state vector, the estimator maintains a respective Cholesky factor for each of the state estimates, where the respective Cholesky factor represents a decomposition of the Hessian matrix into a lower triangular matrix and its conjugate transpose.

For example, as shown in FIG. 3, for each current time epoch, estimator 22 first determines, from the image data, feature measurements corresponding to the features observed from the poses along the trajectory and groups the feature measurements according to the features observed within the image data (104). For one or more of the features observed that were from multiple poses along the trajectory, estimate 22 computes, based on the respective group of feature measurements for the feature, one or more constraints that geometrically relate the multiple poses from which the respective feature was observed (105). Those features for which geometric constraints are computed may be viewed as MSCKF features that are excluded from the state vector by estimator 22.

Next, filter 23 of estimator 22 applies an SR-ISF update to update, within the sliding window, each of the state estimates for the VINS and for the features using the IMU data captured throughout the sliding window as VINS 10 moves along the trajectory and the image data obtained at the plurality of poses (106). For example, estimator 22 applies the SR-ISF to recompute, based on updated state data within the sliding window, the state estimates for the VINS and for the positions of the features with the environment, as represented within the state vector, using (1) the IMU data and the image data associated with features observed at any of the plurality of poses within the sliding window, and (2) the set of computed prior constraints linearly constraining the state estimates for the poses. In some examples, estimator 22 utilizes features associated with all poses within the sliding window. In other examples, estimator 22 may utilizes the budgeting techniques described herein to apply an estimation policy for deciding, which measurements will be processed based on the available computational resources the current SR-ISF update.

Next, estimator 22 updates, for each of the state estimates, the respective Cholesky factor of uncertainty data (108). As described herein, uncertainty data may comprise a square root factor of a Hessian matrix. For example, estimator 22 may maintain the uncertainty data in the form of the Cholesky factor of the Hessian matrix.

In addition, estimator 22 computes updates for the set of prior constraints to be used in the next iteration (110). Based on the computed state estimates, estimator 22 may further output a navigation user interface, e.g., a map, e.g., a 2D or 3D map, of the environment overlaid with the position and/or orientation of the frame of reference (114). The map may, for example, construct the user interface to include position and orientation information for the VINS along the trajectory relative to position information for any landmarks observed by the VINS. The map may further include position information for features observed along the trajectory. The user interface may be displayed, stored, used for subsequent navigation and the like.

Further, in some examples, estimator 22 performs loop closure to reduce error in the approximated mapping solutions. As described above, estimator 22 may allow VINS 10 to efficiently build a map including approximate positions of features observed along the trajectory as VINS 10 traverses the environment. Loop closure refers to a process wherein, upon returning to a previously mapped location (e.g., completing a "loop" of mapped terrain), estimator 22 of VINS 10 uses corresponding IMU data and image data associated with observed features at the previously mapped location to update the state vector and reduce accumulated uncertainty data in the state estimates. Thus, estimator 22 may use loop closure to allow VINS 10 to efficiently build the map of approximate positions of observed features and further increase accuracy in the approximated positions of observed features.

In some examples, VINS 10 operates in two modes to address the particular needs of the two key phases of the SLAM problem: exploration and re-localization. During exploration, VINS 10 navigates through a new area and obtains IMU data and image data for the environment. Thus, the feature observations available for processing span only a short window of recent poses. During re-localization, VINS 10 enters previously visited areas. This way, loop closure measurements become available, which relate recent camera poses with past ones. These loop closure measurements provide key information for removing pose drift but may typically be expensive to process. Thus, distinguishing between the two modes allows VINS 10 to use approximations for efficiently processing loop closure measurements while maintaining estimation consistency.

In one example, after initialization, VINS 10 begins in exploration mode. Estimator 22 optimizes over a sliding window of recent states involved in the local feature-track measurements, with cost constant (determined by the size of the window). Once estimator 22 detects a set of loop closure measurements, VINS 10 enters the re-localization mode, and instantiates two threads to process local feature-track measurements as well as loop closure observations. In the frontend thread, VINS 10 estimates a window of recent states using both types of visual measurements with constant cost. The optimization of other (past) states, which has approximately linear cost in the size of the states, is assigned to the backend. Note that the two threads may run independently so that the frontend can add new states and provide estimates even while the backend is still running. Once the backend thread finishes updating the past states, the frontend thread employs its feedback so that recent states are also corrected. Once all the states are globally adjusted, VINS 10 may run only the frontend thread to update recent states. Additionally, to conserve processing resources, VINS 10 may elect to run the backend thread only once during each re-localization phase (although VINS 10 may perform backend optimization whenever the thread is idle). Further, when there are no more loop closure measurements available, VINS 10 switches back to the exploration mode.

Figure 4:
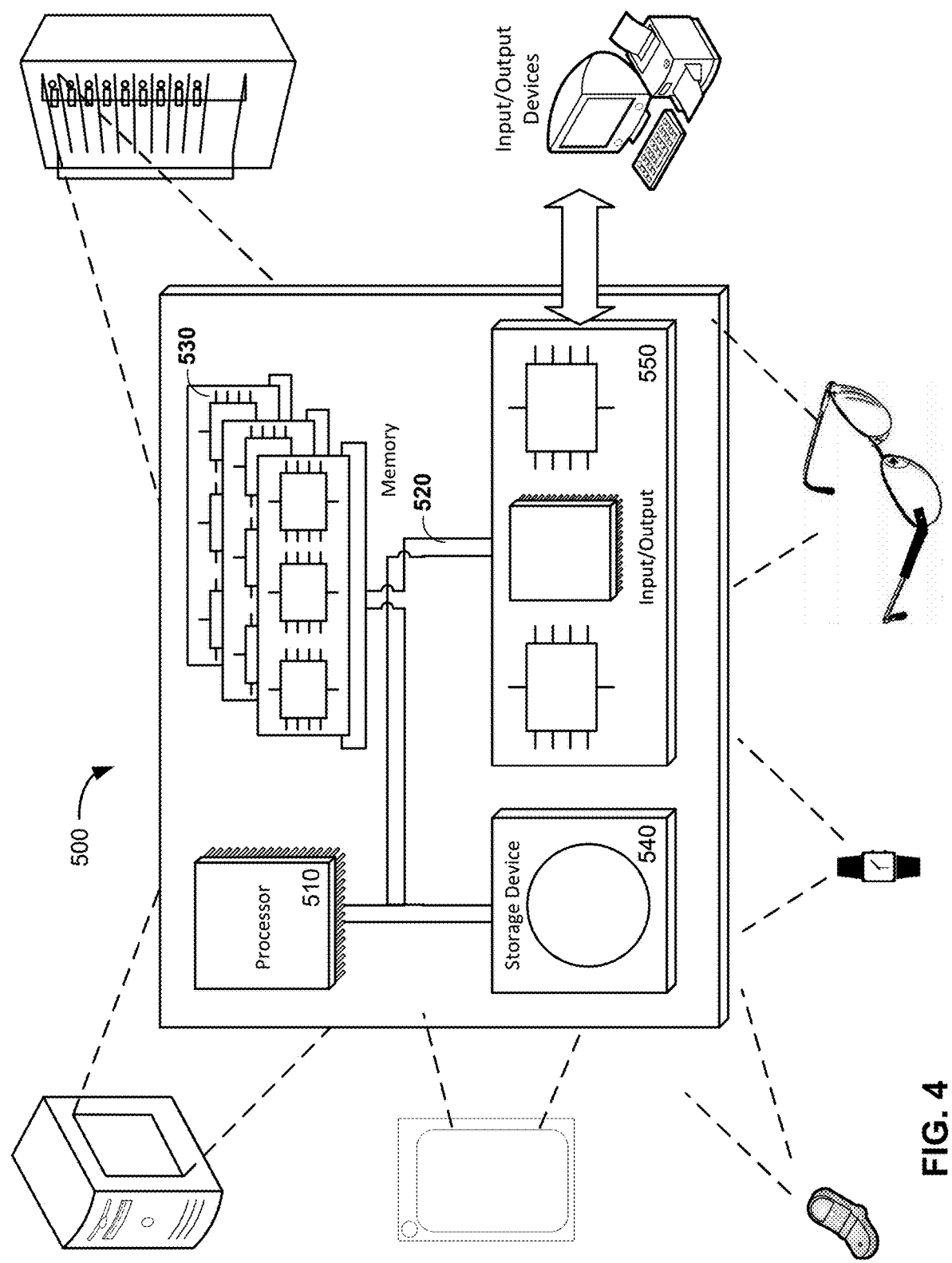
FIG. 4 is an illustrating depicting a detailed example of various devices that may be configured to implement some embodiments in accordance with the techniques described herein.

FIG. 4 is an illustrating depicting a detailed example of various devices that may be configured to implement some embodiments in accordance with the current disclosure. For example, device 500 may be a robot, mobile sensing platform, a mobile phone, a wearable device such as a smartphone or smart watch, a workstation, a computing center, a cluster of servers or other example embodiments of a computing environment, centrally located or distributed, capable of executing the techniques described herein. Any or all of the devices may, for example, implement portions of the techniques described herein for vision-aided inertial navigation systems.

In this example, a computer 500 includes a hardware-based processor 510 that may be implemented within VINS 10 or any device to execute program instructions or software, causing the computer to perform various methods or tasks, such as performing the techniques described herein. Processor 510 may be a general purpose processor, a digital signal processor (DSP), a core processor within an Application Specific Integrated Circuit (ASIC) and the like. Processor 510 is coupled via bus 520 to a memory 530, which is used to store information such as program instructions and other data while the computer is in operation. A storage device 540, such as a hard disk drive, nonvolatile memory, or other non-transient storage device stores information such as program instructions, data files of the multidimensional data and the reduced data set, and other information. As another example, computer 500 may provide an operating environment for execution of one or more virtual machines that, in turn, provide an execution environment for software for implementing the techniques described herein.

The computer also includes various input-output elements 550, including parallel or serial ports, USB, Firewire or IEEE 1394, Ethernet, and other such ports to connect the computer to external device such a printer, video camera, surveillance equipment or the like. Other input-output elements include wireless communication interfaces such as Bluetooth, Wi-Fi, and cellular data networks.

The computer itself may be a traditional personal computer, a rack-mount or business computer or server, or any other type of computerized system. The computer in a further example may include fewer than all elements listed above, such as a thin client or mobile device having only some of the shown elements. In another example, the computer is distributed among multiple computer systems, such as a distributed server that has many computers working together to provide various functions.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer readable data storage medium comprising instructions that, when executed, cause one or more processors to perform one or more of the methods described above. For example, the computer-readable data storage medium or device may store such instructions for execution by a processor. Any combination of one or more computer-readable medium(s) may be utilized.

A computer-readable storage medium (device) may form part of a computer program product, which may include packaging materials. A computer-readable storage medium (device) may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other processing circuitry suitable for implementation of the techniques described herein. In addition, in some aspects, functionality described in this disclosure may be provided within software modules or hardware modules.

Various embodiments of the invention have been described. These and other embodiments are within the scope of the following claims.

What is claimed is:

1. A method comprising:
   receiving, with a processor and from at least one image source, image data for a plurality of poses of a frame of reference along a trajectory within an environment over a period of time, wherein the image data includes features that were each observed within the environment at poses of the frame of reference along the trajectory, and wherein one or more of the features were each observed at multiple ones of the poses of the frame of reference along the trajectory;
   receiving, with the processor and from a motion sensor communicatively coupled to the processor, motion data of the frame of reference in the environment for the period of time;
   computing, with the processor, state estimates for at least a position and orientation of the frame of reference for each of the plurality of poses of the frame of reference along the trajectory by executing a square-root inverse Schmidt-Kalman Filter (SR-ISF)-based estimator configured to:
      for one or more of the features observed from multiple poses along the trajectory, compute one or more constraints that geometrically relate the multiple poses from which the respective feature was observed;
      determine, in accordance with the motion data and the one or more computed constraints, the state estimates for at least the position and orientation of the frame of reference for each of the plurality of poses along the trajectory; and
      determine uncertainty data for the state estimates, wherein the estimator maintains the uncertainty data as a square root factor of a Hessian matrix; and
   outputting, by the processor and based on the computed state estimates, information to a display of one of a virtual reality device or an augmented reality device.

2. The method of claim 1, further comprising computing, with the processor and based on the computed state estimates, positions of the features that were each observed within the environment.

3. The method of claim 1, further comprising computing, with the processor and based on the computed state estimates, a map of the positions of the features that were each observed within the environment.

4. The method of claim 3, further comprising computing, with the processor and based on the computed state estimates, a position of a vision-aided inertial navigation system (VINS) within the map.

5. The method of claim 1, wherein the uncertainty data comprises a Cholesky factor of the Hessian matrix.

6. The method of claim 1, wherein executing the SR-ISF-based estimator comprises:
maintaining a state vector for the positions and orientations of a vision-aided inertial navigation system (VINS) and for positions with the environment for features observed within the environment, and
excluding, from the state vector, state information representing estimates for positions within the environment for the features that were each observed from the multiple poses and for which the one or more constraints were computed.

7. The method of claim 6, wherein excluding, from the state vector, the state information comprises excluding, from the Hessian matrix from which the square root factor is determined, the features that were each observed from the multiple poses and for which the one or more constraints were computed.

8. The method of claim 1, wherein executing the SR-ISF-based estimator comprises:
determining, from the image data, feature measurements corresponding to the features observed from the poses along the trajectory;
grouping the feature measurements according to the features observed within the image data; and
for the one or more of the features observed from multiple poses along the trajectory, computing, based on the respective group of feature measurements for the feature, the one or more constraints that geometrically relate the multiple poses from which the respective feature was observed.

9. The method of claim 1, wherein computing one or more constraints that geometrically relate the multiple poses from which the respective feature was observed comprises performing a QR factorization of the state estimates for at least the position and orientation of the frame of reference for each of the plurality of poses along the trajectory and the uncertainty data for the state estimates.

10. A method comprising:
receiving, with a processor and from at least one image source, image data for a plurality of poses of a frame of reference along a trajectory within an environment over a period of time, wherein the image data includes features that were each observed within the environment at poses of the frame of reference along the trajectory, and wherein one or more of the features were each observed at multiple ones of the poses of the frame of reference along the trajectory;
receiving, with the processor and from a motion sensor communicatively coupled to the processor, motion data of the frame of reference in the environment for the period of time;
computing, with the processor, state estimates for at least a position and orientation of the frame of reference for each of the plurality of poses of the frame of reference along the trajectory by executing a square-root inverse Schmidt-Kalman Filter (SR-ISF)-based estimator configured to:
for one or more of the features observed from multiple poses along the trajectory, compute one or more constraints that geometrically relate the multiple poses from which the respective feature was observed;
determine, in accordance with the motion data and the one or more computed constraints, the state estimates for at least the position and orientation of the frame of reference for each of the plurality of poses along the trajectory; and
determine uncertainty data for the state estimates, wherein the estimator maintains the uncertainty data as a square root factor of a Hessian matrix; and
controlling, by the processor and based on the computed state estimates, navigation of a vision-aided inertial navigation system (VINS).

11. The method of claim 10, further comprising computing, with the processor and based on the computed state estimates, positions of the features that were each observed within the environment.

12. The method of claim 10, further comprising computing, with the processor and based on the computed state estimates, a map of the positions of the features that were each observed within the environment.

13. A method comprising:
receiving, with a processor and from at least one image source, image data for a plurality of poses of a frame of reference along a trajectory within an environment over a period of time, wherein the image data includes features that were each observed within the environment at poses of the frame of reference along the trajectory, and wherein one or more of the features were each observed at multiple ones of the poses of the frame of reference along the trajectory;
receiving, with the processor and from a motion sensor communicatively coupled to the processor, motion data of the frame of reference in the environment for the period of time;
computing, with the processor, state estimates for at least a position and orientation of the frame of reference for each of the plurality of poses of the frame of reference along the trajectory by executing a square-root inverse Schmidt-Kalman Filter (SR-ISF)-based estimator configured to:
for one or more of the features observed from multiple poses along the trajectory, compute one or more constraints that geometrically relate the multiple poses from which the respective feature was observed;
determine, in accordance with the motion data and the one or more computed constraints, the state estimates for at least the position and orientation of the frame of reference for each of the plurality of poses along the trajectory; and
determine uncertainty data for the state estimates, wherein the estimator maintains the uncertainty data as a square root factor of a Hessian matrix; and
outputting, by the processor and based on the computed state estimates, navigation information to a display of a mobile device.

14. The method of claim 13, wherein the uncertainty data comprises a Cholesky factor of the Hessian matrix.

15. The method of claim 13, further comprising computing, with the processor and based on the computed state estimates, positions of the features that were each observed within the environment.

16. The method of claim 13, further comprising computing, with the processor and based on the computed state estimates, a map of the positions of the features that were each observed within the environment.

17. The method of claim 13, wherein the uncertainty data comprises a Cholesky factor of the Hessian matrix.

18. A vision-aided inertial navigation system (VINS) comprising:

at least one image source to produce image data for a plurality of poses of a frame of reference along a trajectory within an environment over a period of time, wherein the image data includes features that were each observed within the environment at poses of the frame of reference along the trajectory, wherein one or more of the features were each observed at multiple ones of the poses of the frame of reference along the trajectory;

a motion sensor configured to provide motion data of the frame of reference in the environment for the period of time; and a hardware-based processor communicatively coupled to the image source and communicatively coupled to the motion sensor, the processor configured to compute state estimates for at least a position and orientation of the frame of reference for each of the plurality of poses of the frame of reference along the trajectory, wherein the processor executes a square-root inverse Schmidt-Kalman Filter (SR-ISF)-based estimator configured to:

for one or more of the features observed from multiple poses along the trajectory, compute one or more constraints that geometrically relate the multiple poses from which the respective feature was observed;

determine, in accordance with the motion data and the one or more computed constraints, the state estimates for at least the position and orientation of the frame of reference for each of the plurality of poses along the trajectory; and determine uncertainty data for the state estimates, wherein the estimator maintains the uncertainty data as a square root factor of a Hessian matrix, wherein the VINS comprises one of a robot, a vehicle, an unmanned aerial vehicle, a tablet, a mobile device, or a wearable computing device.

19. The VINS of claim 18, wherein the processor is further configured to compute, based on the computed state estimates, positions of the features that were each observed within the environment.

20. The VINS of claim 18, wherein the processor is further configured to compute, based on the computed state estimates, a map of the positions of the features that were each observed within the environment.

21. The VINS of claim 20, wherein the processor is further configured to compute, based on the computed state estimates, a position of the VINS within the map.

22. The VINS of claim 18, wherein the estimator maintains the uncertainty data as a Cholesky factor of the Hessian matrix.

23. The VINS of claim 18, wherein, when executing the SR-ISF-based estimator, the processor:

maintains a state vector for the positions and orientations of the VINS and for positions with the environment for features observed within the environment, and excludes, from the state vector, state information representing estimates for positions within the environment for the features that were each observed from the multiple poses and for which the one or more constraints were computed.

24. The VINS of claim 23, wherein the Hessian matrix, from which the square root factor is determined, excludes the features that were each observed from the multiple poses and for which the one or more constraints were computed.

25. The VINS of claim 18, wherein, when executing the SR-ISF-based estimator, the processor:

determines, from the image data, feature measurements corresponding to the features observed from the poses along the trajectory, groups the feature measurements according to the features observed within the image data, and for the one or more of the features observed from multiple poses along the trajectory, computes, based on the respective group of feature measurements for the feature, the one or more constraints that geometrically relate the multiple poses from which the respective feature was observed.

26. The VINS of claim 18, wherein, to compute the one or more constraints that geometrically relate the multiple poses from which the respective feature was observed, the SR-ISF-based estimator is further configured to:

perform a QR factorization of the state estimates for at least the position and orientation of the frame of reference for each of the plurality of poses along the trajectory and the uncertainty data for the state estimates.

27. The VINS of claim 18, wherein the processor is further configured to control, based on the computed state estimates, navigation of the VINS.

28. The VINS of claim 18, wherein the VINS comprises the mobile device, and wherein the processor is further configured to output, based on the computed state estimates, navigation information to a display of the mobile device.

29. The VINS of claim 18, wherein the processor is further configured to output, based on the computed state estimates, information to a display of one of a virtual reality device or an augmented reality device.

30. A non-transitory, computer-readable medium comprising instructions configured to cause one or more processors of a vision-aided inertial navigation system (VINS) to:

receive, from at least one image source, image data for a plurality of poses of a frame of reference along a trajectory within an environment over a period of time, wherein the image data includes features that were each observed within the environment at poses of the frame of reference along the trajectory, and wherein one or more of the features were each observed at multiple ones of the poses of the frame of reference along the trajectory;

receive, with the processor and from a motion sensor communicatively coupled to the processor, motion data of the frame of reference in the environment for the period of time;

compute, with the processor, state estimates for at least a position and orientation of the frame of reference for each of the plurality of poses of the frame of reference along the trajectory by executing a square-root inverse Schmidt-Kalman Filter (SR-ISF)-based estimator configured to:

for one or more of the features observed from multiple poses along the trajectory, compute one or more constraints that geometrically relate the multiple poses from which the respective feature was observed;

determine, in accordance with the motion data and the one or more computed constraints, the state estimates for at least the position and orientation of the frame of reference for each of the plurality of poses along the trajectory; and determine uncertainty data for the state estimates, wherein the estimator maintains the uncertainty data as a square root factor of a Hessian matrix; and output, based on the computed state estimates, information to a display of one of a virtual reality device or an augmented reality device.

* * * * *